(12) United States Patent
Kothari et al.

(10) Patent No.: US 8,422,514 B1
(45) Date of Patent: Apr. 16, 2013

(54) DYNAMIC CONFIGURATION OF CROSS-DOMAIN PSEUDOWIRES

(75) Inventors: Bhupesh Kothari, San Jose, CA (US); Nischal Sheth, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 217 days.

(21) Appl. No.: 12/755,990

(22) Filed: Apr. 7, 2010

Related U.S. Application Data

(60) Provisional application No. 61/302,732, filed on Feb. 9, 2010.

(51) Int. Cl.
 *H04J 3/16* (2006.01)
 *H04J 3/22* (2006.01)

(52) U.S. Cl.
 USPC ........... 370/466; 370/467; 370/401; 370/351; 370/352

(58) Field of Classification Search .................. 370/466, 370/467, 389, 401, 351–356
 See application file for complete search history.

(56) References Cited

U.S. PATENT DOCUMENTS

| | | | |
|---|---|---|---|
| 5,600,642 A | 2/1997 | Pauwels et al. |
| 6,374,303 B1 | 4/2002 | Armitage et al. |
| 6,477,166 B1 | 11/2002 | Sanzi et al. |
| 6,493,349 B1 | 12/2002 | Casey |
| 6,501,754 B1 | 12/2002 | Ohba et al. |
| 6,553,028 B1 | 4/2003 | Tang et al. |
| 6,597,703 B1 | 7/2003 | Li et al. |
| 6,731,652 B2 | 5/2004 | Ramfelt et al. |
| 6,751,218 B1 | 6/2004 | Hagirahim et al. |
| 6,778,531 B1 | 8/2004 | Kodialam et al. |
| 6,807,182 B1 | 10/2004 | Dolphin et al. |
| 6,879,594 B1 | 4/2005 | Lee et al. |
| 6,920,503 B1 | 7/2005 | Nanji et al. |

(Continued)

FOREIGN PATENT DOCUMENTS

| | | |
|---|---|---|
| JP | 2005-086222 | 3/2005 |
| JP | 2005-130258 | 5/2005 |

(Continued)

OTHER PUBLICATIONS

L. Martini et al., "Transport of Layer 2 Frames Over MPLS," Network Working Group Internet Draft, draft-martini-l2circuit-trans-mpls-08.txt, Nov. 2001, 18 pgs.

(Continued)

*Primary Examiner* — Chuong T Ho
(74) *Attorney, Agent, or Firm* — Shumaker & Sieffert, P.A.

(57) ABSTRACT

In general, techniques are described for dynamically configuring cross-domain pseudowires (PWs). A network device positioned between a first domain and a second domain of a computer network may implement the techniques. The intermediate network device comprises at least one interface and an LDP module, a transformation module and a routing protocol module. The interface receives a label distribution protocol (LDP) message that includes data for configuring a cross-domain PW from a first provider edge (PE) device of the first domain. The LDP module parses the received LDP message to extract the cross-domain PW configuration data. The translation module transforms the extracted data to conform to routing protocol extensions for advertising the cross-domain PW configuration data. The routing protocol module forms a routing protocol message that includes the transformed data. The interface outputs the routing protocol message to the second intermediate device of the second domain to establish the cross-domain PW.

43 Claims, 12 Drawing Sheets

U.S. PATENT DOCUMENTS

| | | | |
|---|---|---|---|
| 6,968,389 B1 | 11/2005 | Menditto et al. | |
| 7,035,226 B2 | 4/2006 | Enoki et al. | |
| 7,039,687 B1 | 5/2006 | Jamieson et al. | |
| 7,082,102 B1 | 7/2006 | Wright | |
| 7,133,928 B2 | 11/2006 | McCanne | |
| 7,251,218 B2 | 7/2007 | Jorgensen | |
| 7,269,135 B2 | 9/2007 | Frick et al. | |
| 7,281,058 B1 | 10/2007 | Shepherd et al. | |
| 7,330,468 B1 | 2/2008 | Tse-Au | |
| 7,333,491 B2 | 2/2008 | Chen et al. | |
| 7,359,328 B1 | 4/2008 | Allan | |
| 7,360,084 B1 | 4/2008 | Hardjono | |
| 7,366,894 B1 | 4/2008 | Kalimuthu et al. | |
| 7,418,003 B1 | 8/2008 | Alvarez et al. | |
| 7,463,591 B1 | 12/2008 | Kompella et al. | |
| 7,477,642 B2 | 1/2009 | Aggarwal et al. | |
| 7,483,439 B2 | 1/2009 | Shepherd et al. | |
| 7,519,010 B1 | 4/2009 | Aggarwal et al. | |
| 7,522,599 B1 | 4/2009 | Aggarwal et al. | |
| 7,522,600 B1 | 4/2009 | Aggarwal et al. | |
| 7,545,735 B1 | 6/2009 | Shabtay et al. | |
| 7,558,219 B1 | 7/2009 | Aggarwal et al. | |
| 7,558,263 B1 | 7/2009 | Aggarwal et al. | |
| 7,564,803 B1 | 7/2009 | Minei et al. | |
| 7,564,806 B1 | 7/2009 | Aggarwal et al. | |
| 7,570,604 B1 | 8/2009 | Aggarwal et al. | |
| 7,570,605 B1 | 8/2009 | Aggarwal et al. | |
| 7,590,115 B1* | 9/2009 | Aggarwal et al. | 370/390 |
| 7,792,123 B2* | 9/2010 | Hu | 370/395.53 |
| 7,801,138 B2* | 9/2010 | Du et al. | 370/392 |
| 7,804,790 B1 | 9/2010 | Aggarwal et al. | |
| 2002/0071390 A1 | 6/2002 | Reeves et al. | |
| 2002/0109879 A1 | 8/2002 | Wing So | |
| 2002/0118644 A1 | 8/2002 | Moir | |
| 2002/0181477 A1 | 12/2002 | Mo et al. | |
| 2002/0186664 A1 | 12/2002 | Gibson et al. | |
| 2002/0191584 A1 | 12/2002 | Korus et al. | |
| 2003/0012215 A1 | 1/2003 | Novaes | |
| 2003/0021282 A1 | 1/2003 | Hospodor | |
| 2003/0031175 A1 | 2/2003 | Hayashi et al. | |
| 2003/0043772 A1 | 3/2003 | Mathis et al. | |
| 2003/0056007 A1 | 3/2003 | Katsube et al. | |
| 2003/0063591 A1 | 4/2003 | Leung et al. | |
| 2003/0087653 A1 | 5/2003 | Leung et al. | |
| 2003/0088696 A1 | 5/2003 | McCanne | |
| 2003/0099235 A1 | 5/2003 | Shin et al. | |
| 2003/0108047 A1 | 6/2003 | Mackiewich et al. | |
| 2003/0112748 A1 | 6/2003 | Puppa et al. | |
| 2003/0123446 A1 | 7/2003 | Muirhead et al. | |
| 2003/0177221 A1 | 9/2003 | Ould-Brahim et al. | |
| 2003/0191937 A1 | 10/2003 | Balissat et al. | |
| 2003/0210705 A1 | 11/2003 | Seddigh et al. | |
| 2004/0037279 A1 | 2/2004 | Zelig et al. | |
| 2004/0042406 A1 | 3/2004 | Wu et al. | |
| 2004/0047342 A1 | 3/2004 | Gavish et al. | |
| 2004/0081154 A1 | 4/2004 | Kouvelas | |
| 2004/0151180 A1 | 8/2004 | Hu et al. | |
| 2004/0151181 A1 | 8/2004 | Chu et al. | |
| 2004/0165600 A1 | 8/2004 | Lee | |
| 2004/0190517 A1 | 9/2004 | Gupta et al. | |
| 2004/0218536 A1 | 11/2004 | Yasukawa et al. | |
| 2004/0240445 A1 | 12/2004 | Shin et al. | |
| 2004/0240446 A1 | 12/2004 | Compton | |
| 2005/0001720 A1 | 1/2005 | Mason et al. | |
| 2005/0018693 A1 | 1/2005 | Dull | |
| 2005/0027782 A1 | 2/2005 | Jalan et al. | |
| 2005/0097203 A1 | 5/2005 | Unbehagen et al. | |
| 2005/0108419 A1 | 5/2005 | Eubanks | |
| 2005/0111351 A1 | 5/2005 | Shen | |
| 2005/0169270 A1 | 8/2005 | Mutou et al. | |
| 2005/0220022 A1* | 10/2005 | DelRegno et al. | 370/235 |
| 2005/0220132 A1 | 10/2005 | Oman et al. | |
| 2005/0232193 A1 | 10/2005 | Jorgensen | |
| 2005/0262232 A1 | 11/2005 | Cuervo et al. | |
| 2005/0265308 A1 | 12/2005 | Barbir et al. | |
| 2005/0271035 A1 | 12/2005 | Cohen et al. | |
| 2005/0271036 A1 | 12/2005 | Cohen et al. | |
| 2005/0281192 A1 | 12/2005 | Nadeau et al. | |
| 2006/0013141 A1 | 1/2006 | Mutoh et al. | |
| 2006/0039364 A1 | 2/2006 | Wright | |
| 2006/0047851 A1 | 3/2006 | Voit et al. | |
| 2006/0088031 A1 | 4/2006 | Nalawade | |
| 2006/0126496 A1 | 6/2006 | Filsfils et al. | |
| 2006/0147204 A1 | 7/2006 | Yasukawa et al. | |
| 2006/0153067 A1 | 7/2006 | Vasseur et al. | |
| 2006/0164975 A1 | 7/2006 | Filsfils et al. | |
| 2006/0182034 A1 | 8/2006 | Klinker et al. | |
| 2006/0221958 A1 | 10/2006 | Wijnands et al. | |
| 2007/0025277 A1 | 2/2007 | Sajassi et al. | |
| 2007/0036162 A1 | 2/2007 | Tingle et al. | |
| 2007/0098003 A1 | 5/2007 | Boers et al. | |
| 2007/0124454 A1 | 5/2007 | Watkinson | |
| 2007/0140107 A1 | 6/2007 | Eckert et al. | |
| 2008/0056258 A1 | 3/2008 | Sharma et al. | |
| 2008/0101390 A1* | 5/2008 | Hu | 370/401 |
| 2008/0123524 A1 | 5/2008 | Vasseur et al. | |
| 2008/0225864 A1* | 9/2008 | Aissaoui et al. | 370/401 |
| 2008/0253367 A1* | 10/2008 | Ould-Brahim | 370/389 |
| 2008/0291921 A1* | 11/2008 | Du et al. | 370/395.53 |
| 2009/0028149 A1 | 1/2009 | Yasukawa et al. | |
| 2009/0175274 A1 | 7/2009 | Aggarwal et al. | |
| 2011/0026530 A1* | 2/2011 | Du et al. | 370/395.53 |

FOREIGN PATENT DOCUMENTS

| | | |
|---|---|---|
| JP | 2005-167482 | 6/2005 |
| JP | 2005-252385 | 9/2005 |
| JP | 2005-323266 | 11/2005 |
| KR | 2004001206 | 1/2004 |
| WO | WO 02/091670 A2 | 11/2002 |
| WO | WO 2004/071032 A1 | 8/2004 |

OTHER PUBLICATIONS

L. Martini et al., "Encapsulation Methods for Transport of Layer 2 Frames Over IP and MPLS Networks," Network Working Group Internet Draft, draft-martini-l2circuit-encapmpls-04.txt, Nov. 2001, 17 pgs.

Eric C. Rosen et al., "Multicast in MPLS/BGP IP VPNs," draft-rosen-vpn-mcast-07.txt, May 2004, 27 pgs.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

K. Kompella et al., "Virtual Private LAN Service," draft-ietf-l2vpn-vpls-bgp-00.txt, May 2003, 22 pgs.

Y. Rekhter et al., "A Border Gateway Protocol 4 (BGP-4)," Mar. 1995, 72 pgs.

Satyanarayana et al., "Extensions to GMPLS RSVP Graceful Restart", draft-aruns-ccamprestart-ext-01,txt, Jul. 2004, Network Working Group Internet Draft, 23 pgs.

Aggarwal et al., "Establishing Point to Multipoint MPLS TE LSPs," IETF, submitted to Internet Engineering Task Force (IETF) Jan. 2004, 15 pp.

Yasukawa et al. "Requirements for Point to Multipoint extension to RSVP-TE," IETF, Oct. 2003, pp. 1-20.

Atlas et al., "MPLS RSVP-TE Interoperability for Local ProtectionIFast Reroute," IETF, Jul. 2001, pp. 1-14.

B. Zhang and H. Mouftah, "A Destination-initiated Multicast Routing Protocol for Shortest Path Tree Constructions," GLOBECOM 2003, IEEE Global Telecommunications Conference, XPO10677629. pp. 2840-2844.

D. Awduche et al., "RFC 3209—RSVP-TE: Extensions to RSVP for LSP Tunnels," Network Working Group, Dec. 2001, 62 pgs., http://rfc.sunsite.dk/rfc/rfc3209html.

RSVP—TE: Resource Reservation Protocol—Traffic Extension, Jawin Company, 2pgs. Printed Apr. 18, 2005, http://www.javvin.com/protoco1RSVPTE.html.

Aggarwal et al., "MPLS Upstream Label Assignment for RSVP-TE and LDP," Aug. 24, 2005, http://www.tla-group.com/-mpls/ietf-63-mpls-upstream-rsvp-ldp.ppt, 8 pgs.

Norihito et al., "Dynamic Selective Replication Schemes for Content Delivery Networks," IPSJ SIG Notes, vol. 2001, No. 111, pp. 61-68, Information Processing Society of Japan, Nov. 21, 2001.

Wijnands et al., "Multicast Extensions for LDP," Network Working Group, Internet Draft, Mar. 2005, 13 pgs.

Aggarwal et al., "MPLS Upstream Label Assignment and Context Specific Label Space," Network Working Group, Internet Draft, Jan. 2005, 9 pgs.

Bryant et al., RFC 3985: "Pseudo Wire Emulation Edge-to-Edge (PWE3) Architecture," Mar. 2005, 40 pp.

Bitar et al., RFC 5254: "Requirements for Multi-Segment Pseudowire Emulation Edge-to-Edge (PWE3)," Oct. 2008, 27 pp.

Rosen et al., RFC 4364: BGP/MPLS IP Virtual Private Networks (VPNs), Feb. 2006, 44 pp.

VIXIE, RFC 1996: "A Mechanism for Prompt Notification of Zone Changes (DNS Notify)," Aug. 1996, 7 pp.

Martini et al., RFC 4447: "Pseudowire Setup and Maintenance Using the Label Distribution Protocol (LDP)," Apr. 2006, 18 pp.

* cited by examiner

DYNAMIC CONFIGURATION OF CROSS-DOMAIN PSEUDOWIRES

This application claims the benefit of U.S. Provisional Application No. 61/302,732, filed Feb. 9, 2010, the entire content of which is incorporated by reference herein.

TECHNICAL FIELD

The techniques of this disclosure relate to computer networks and, more particularly, to configuring connections across multiple computer network domains.

BACKGROUND

Computer networks generally implement one or more network protocols. Some computer networks implement legacy cell-based network protocols, such as an Asynchronous Transfer Mode (ATM) network protocol. More recently, computer networks have been migrating to packet-based network protocols, such as an Internet Protocol (IP), where packets are switched through the computer network via various network segments referred to as "next hops." While the packet-switched computer networks provide many benefits in terms of cost and data routing, various network services often require connections that resemble those of legacy computer networks.

To emulate these connections, packet-switched computer networks support a service commonly referred to as a "pseudowire." Pseudowires (PWs) are defined paths with packet-switched networks that emulated physical connections. That is, one established within the network, a PW provides a multi-hop path for forwarding traffic between a source device and at least one destination device as if the devices were connected by a direct, physical connection. Commonly, the source devices are referred to as ingress devices of the PW and the destination devices are referred to as egress devices. Usually, the ingress and egress devices reside within the same computer network and are usually located at the edges of the computer network. That is, a PW typically emulates a single physical connection that spans the computer network. When the computer network comprises a single autonomous system (AS) or interior gateway protocol (IGP) domains, this form of PW is often referred to as single-segment (SS) PWs (SS-PWs) in that this form of PW is commonly set up directly between two provider edge (PE) devices of the AS or IGP domains. When the computer network includes two or more ASes or IGPs and the PW spans two or more of the domains, e.g., ASes, this form of PW is often referred to as a cross-domain PW. Traditionally PWs were limited to a single AS, but recent advances in PWs have enabled these single AS PWs to be linked or stitched together to form a type of cross-domain PW referred to as a multi-segment PW (MS-PW). In contrast to SS-PWs, a multi-segment PW refers to a statically or dynamically configured set of two or more contiguous PW segments that each behave and function as a single point-to-point PW. The term "PW segment" refers to a single segment or a part of a multi-segment PW, which is set up between two PE devices. More information regarding PWs and the architecture required to support PWs is available in Request for Comments (RFC) 3985, entitled "Pseudo Wire Emulation Edge-to-Edge (PWE3) Architecture," dated March 2005, the entire contents of which are hereby incorporated by references as if set forth in its entirety herein. More information regarding the requirements for MS-PW is available in RFC 5254, entitled "Requirements for Multi-Segment Pseudowire Emulation Edge-to-Edge (PWE3)," dated October 2008, the entire contents of which are hereby incorporated as if fully set forth in its entirety herein.

As one example, service provider networks organized as separate ASes and may utilize a MS-PW to transport traffic across the ASes. In this scenario, provider edge (PE) routers located at the edge of the ASes form the MS-PW to transport layer 2 (L2) traffic between customer networks, where the L2 traffic typically takes the form of Ethernet frames or ATM cells. This traffic may be encapsulated and tunneled through the packet-switched service provider networks along the MS-PW. To form the MS-PW, the PE devices may be statically configured to support the MS-PW. However, the static configuration of pseudowires is burdensome to administrators of the service provider networks.

Alternatively, the MS-PW may be dynamically configured. In the dynamic configuration of MS-PW, the ingress and egress PE devices are required to support a specific layer three (L3) routing protocol referred to as a Border Gateway Protocol (BGP) that includes extensions for communicating MS-PW information. The PE devices establish BGP peering session with each other and exchange the MS-PW information across the ASes. The requirement to deploy this specific network routing protocol on all PE devices that operate as ingresses or egresses of MS-PWs may be restrictive and burdensome on the service provider. For example, the PE devices may not otherwise be configured to communicate across the ASes directly and, may not otherwise even be configured to implement BGP. BGP is a complex routing protocol typically used to communicate routing information between border routers of different service provider networks.

SUMMARY

Techniques are described that enable dynamic configuration of a cross-domain PWs. Moreover, the techniques of the disclosure provide dynamic configuration of the cross-domain PW without requiring the ingress and egress routing devices to implement BGP or any other layer three (L3) routing protocol that includes special extensions to advertise information for the cross-domain PW across the multiple domains, such as autonomous systems (ASes), of the service provider networks. Instead, the edge devices may be able to only use standard BGP procedures or use an entirely different routing protocol in a standard way and need not be burdened with advanced software required to manage the advertisement of the PW information. Moreover, in some cases, the edge devices need not implement BGP at all and only intermediate routing devices located intermediate to the ingress and egress routing devices may implement BGP or any other such extended routing protocol, thereby enabling this cross-domain or cross-AS PW without necessarily requiring that the customer-side ingress and egress devices of the cross-domain PW be burdened with implementing the extended portion of the BGP routing procedures and be forced to maintain BGP peering sessions with devices in other domains, e.g., ASes.

Multiple ways for facilitating dynamic PW configurations are described herein. In a first way, border routers implement the techniques of this disclosure to establish a form of cross-domain PW referred to as a multi-segment PW (MS-PW) that spans two or more ASes. The border router receives an LDP message that contains data for configuring the MS-PW and transforms this data such that it can be conveyed via an extension of a BGP message. Through this transformation of data from an LDP message format to a BGP message format, the border router may eliminate any need for the customer-side ingress and egress devices to implement a routing protocol capable of conveying PW configuration data.

In the second way, rather than rely on BRs to transform the data from the LDP message into data storable to the extensions of the BGP message, route reflectors (RRs) perform the transformation of the PW configuration data received via the LDP message. In some examples, in this second way of dynamically configuring a cross-domain PW, the resulting PW that spans both the ASes comprises a single segment PW (SS-PW). That is, the traditional usage of SS-PW and the implications that SS-PWs may not span multiple ASes is not used herein as the techniques of this disclosure enable SS-PWs to span multiple ASes or, more generally, domains. In this second way, again, the ingress and egress devices do not necessarily need to support extensions to BGP or other routing protocols (or even the routing protocol itself) that convey PW configuration data, much as is the case in the first way.

In one embodiment, a method comprises receiving, with a first intermediate device, a label distribution protocol (LDP) message from a first provider edge device, the first intermediate device is positioned between a first domain and a second domain of a computer network and in communication with a second intermediate device of the second domain, wherein the first provider edge device is located at an edge of the first domain of the computer network, and wherein the LDP message includes data for configuring a cross-domain pseudowire (PW). The method also comprises parsing, with the first intermediate device, the received LDP message to extract the data for configuring the cross-domain PW, transforming, with the first intermediate device, the extracted data to conform to a format defined by a routing protocol that includes extensions for advertising the cross-domain PW configuration data, forming, with the first intermediate device, a routing protocol message that includes the transformed data and outputting, with the first intermediate device, the routing protocol message to the second intermediate device to establish the cross-domain PW from the first provider edge device to a second provider edge device located at an edge of the second domain of the computer network to span the first domain and the second domain.

In another embodiment, an intermediate network device is positioned between a first domain and a second domain of a computer network and in communication with a second intermediate device of the second domain. The intermediate network device comprises at least one interface that receives a label distribution protocol (LDP) message from a first provider edge device, wherein the first provider edge device is located at an edge of the first domain of the computer network, and wherein the LDP message includes data for configuring a cross-domain pseudowire (PW) and a control unit. The control unit includes an LDP module that parses the received LDP message to extract the data for configuring the cross-domain PW, a translation module that transforms the extracted data to conform to a format defined by a routing protocol that includes extensions for advertising the cross-domain PW configuration data and a routing protocol module that forms a routing protocol message that includes the transformed data. The at least one interface outputs the routing protocol message to the second intermediate device to establish the cross-domain PW from the first provider edge device to a second provider edge device located at an edge of the second domain of the computer network to span the first domain and the second domain.

In another embodiment, a network system comprises a first customer network that includes a first customer edge device positioned at the edge of the first customer network and a second customer network that includes a second customer edge device positioned at the edge of the second customer network. The network system also comprises a first domain that includes a first network device positioned at a border of the first domain and a first provider edge device positioned at an edge of the first domain that is communicatively coupled to the first network device and the first customer edge device. The network system also includes a second domain that comprises a second network device positioned at a border of the second domain that is communicatively coupled to the first network device and a second provider edge device positioned at an edge of the second domain that is communicatively coupled to the second network device and the second customer edge device. The first network device includes at least one interface that receives a label distribution protocol (LDP) message from the first provider edge device, wherein the LDP message includes data for configuring a cross-domain pseudowire (PW) and a control unit. The control unit includes an LDP module that parses the received LDP message to extract the data for configuring the cross-domain PW, a translation module that transforms the extracted data to conform to a format defined by a routing protocol that includes extensions for advertising the cross-domain PW configuration data and a routing protocol module that forms a routing protocol message that includes the transformed data. The at least one interface outputs the routing protocol message to the second network device to establish the cross-domain PW from the first provider edge device to the second provider edge device located at an edge of the second domain of the computer network to span the first domain and the second domain.

In another embodiment, a computer-readable storage medium comprises instructions for causing a processor to receive, with a first intermediate device, a label distribution protocol (LDP) message from a first provider edge device, the first intermediate device is positioned between a first domain and a second domain of a computer network and in communication with a second intermediate device of the second domain, wherein the first provider edge device is located at an edge of the first domain of the computer network, and wherein the LDP message includes data for configuring a cross-domain pseudowire (PW). The instructions further cause the processor to parse, with the first intermediate device, the received LDP message to extract the data for configuring the cross-domain PW, transform, with the first intermediate device, the extracted data to conform to a format defined by a routing protocol that includes extensions for advertising the cross-domain PW configuration data, form, with the first intermediate device, a routing protocol message that includes the transformed data, and output, with the first intermediate device, the routing protocol message to the second intermediate device to establish the cross-domain PW from the first provider edge device to a second provider edge device located at an edge of the second domain of the computer network to span the first domain and the second domain.

In another embodiment, a method comprises receiving, with a first network device positioned at a border of a first domain of a computer network that is in communication with a second network device positioned at a border of a second domain of the computer network, a label distribution protocol (LDP) message from a first provider edge device located at an edge of the first domain of the computer network, wherein the LDP message includes data for configuring a multi-segment pseudowire (MS-PW). The method also comprises parsing, with the first network device, the received LDP message to extract the data for configuring the MS PW, transforming, with the first network device, the extracted data to conform to a format defined by a border gateway protocol (BGP), forming, with the first network device, a BGP message that includes the transformed data, and forwarding, with the first network device, the BGP message to the second network device in communication with a second provider edge device located at an edge of the second domain of the computer network.

In another embodiment, a method comprises receiving, with a first network device of a first domain of a computer network that is in communication with a second network device of a second domain of the computer network, a label distribution protocol (LDP) message from a first provider edge device located in the first domain of the computer network, wherein the LDP message includes data for configuring a single segment pseudowire (SS-PW). The method also comprises parsing, with the first network device, the LDP message to extract the data for configuring the SS-PW, transforming, with the first network device, the data for configuring the SS-PW to conform to a format defined by a border gateway protocol (BGP), forming, with the first network device, a BGP message that includes the transformed data, and forwarding, with the first network device, the BGP message to the second network device in communication with a second provider edge device located at an edge of the second domain of the computer network.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
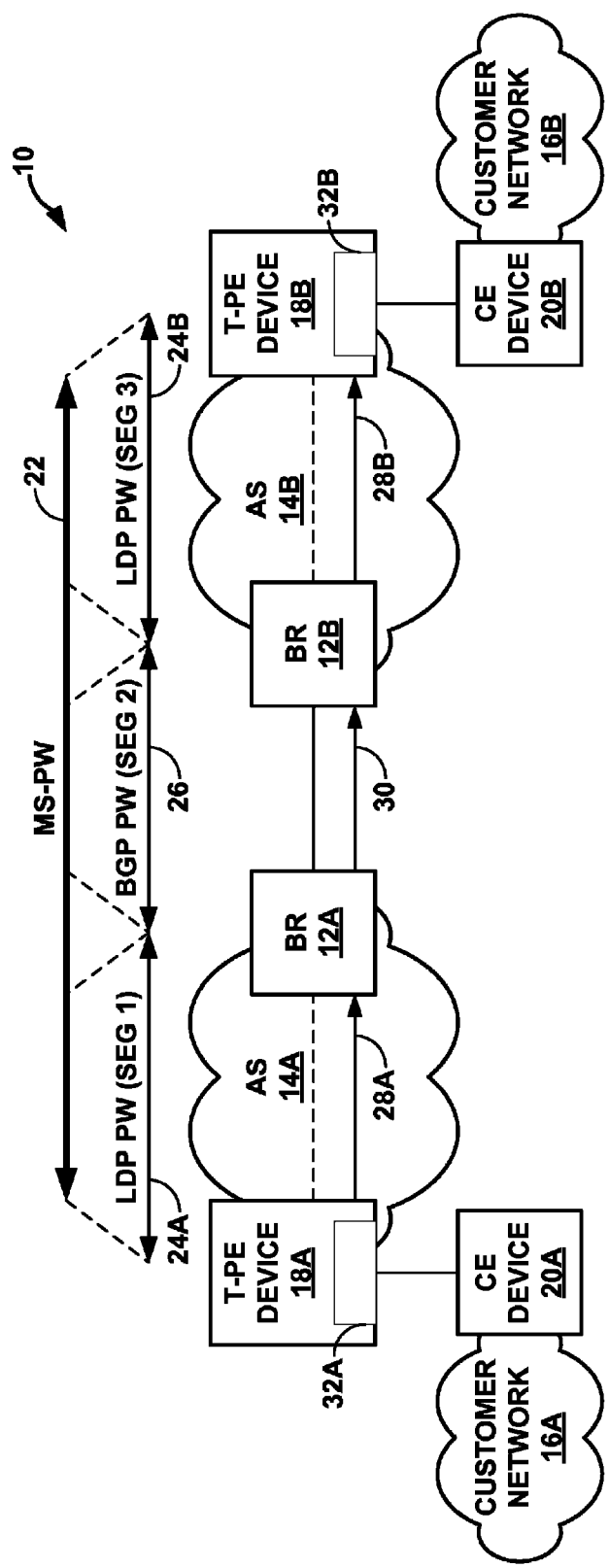
FIG. 1 is a block diagram illustrating a system in which various devices implement the techniques of this disclosure to dynamically configure a cross-domain pseudowire (PW).

FIG. 1 is a block diagram illustrating a system 10 in which various devices implement the techniques of this disclosure to dynamically configure a cross-domain pseudowire (PW). More specifically, in this example, system 10 includes border routers (BRs) 12A, 12B ("BRs 12") that implement the techniques to dynamically configure a cross-domain PW that spans multiple domains, such as autonomous systems (ASes) 14A, 14B ("ASes 14").

In the example of FIG. 1, system 10 includes ASes 14 and customer networks 16A, 16B ("customer networks 16"). Often, ASes 14 are owned and operated by separate service providers (SPs), although in some instances a single SP operates two or more ASes. ASes 14 each represent autonomously administrated domains comprised of interconnected computing devices. Typically, each of ASes 14 is a packet switched network that implements a layer 3 (L3) network protocol, such as an Internet Protocol (IP), over layer two (L2) protocols (e.g. Ethernet, Frame Relay) running on individual physical links, where reference to layers in this disclosure refers to layers of the Open Systems Interconnection (OSI) model. With respect to the IP, ASes 14 communicate data into discrete data units referred to as packets, and routes or switches these packets across ASes 14. Consequently, ASes 14 can each be characterized as a L3 packet-switched network.

AS 14A includes a PW-terminating provider edge (T-PE) device 18A ("T-PE device 18A") and BR 12A, which may be connected by numerous other routing and switching devices interconnected by physical links not shown in FIG. 1. Similarly, AS 14B includes a PW T-PE device 18B and 8R 12B. BRs 12 represent high-end routers that are positioned at a border between ASes 14, hence the name border routers 12. A border of ASes 14 may be distinguished from an edge of ASes 14 in that "edges" usually face or interface with customer networks, such as customer networks 16, while "borders" face other core domains, such as the other one of ASes 14. Each or BRs 12 are typically coupled to each other by one or more high-speed physical connections, thereby providing connectivity for traffic flow between ASes 14. T-PE devices 18 each represent network devices positioned at the edge of ASes 14. The devices typically include L3 routing capability and operate to terminate a PW formed in accordance with the techniques of this disclosure, hence the name PW-terminating provider edge devices 18. Commonly, each of T-PE devices 18 comprises a digital subscriber line access multiplexer (DSLAM) that executes one or more routing protocols to perform L3 routing functions with respect to traffic from customer networks 16. While described with respect to specific network devices, i.e., routers and DSLAMs, the techniques may be implemented by any network device, including route reflectors as described below in more detail with respect to FIG. 2.

Customer networks 16 are, as one example, privately owned networks. Typically, a single entity, such as a business or enterprise, owns both of customer networks 16. Customer networks 16 typically implement a layer 2 (L2) network protocol, such as an Ethernet protocol. Customer networks 16 may be referred to herein as Ethernet networks 16 to illustrate one example L2 network protocol that customer networks 16 implement in contrast to the L3 network protocols implemented by ASes 14. Being layer 2 networks, customer networks 16 include L2 devices, which are represented in the example of FIG. 1 as customer edge (CE) devices 20A, 20B ("CE devices 20"). Each CE devices 20 are positioned at the edge of respective customer networks 16, hence the name customer edge devices 20, and interface with respective T-PE devices 18 of ASes 14. In effect, CE devices 20 provide an interface from L2 customer networks 16 to respective L3 ASes 14. CE devices 20 may comprise routers that implement both L2 and L3 protocols so as to transform the L2 data units, e.g., Ethernet frames, into L3 data units, e.g., packets, for transmission across L3 ASes 14. Alternatively, CE devices 20 may comprise L2 devices that transmit L2 data units, and T-PE devices 18 implement both L2 and L3 protocols so as to transform the L2 data units into L3 data units for transmission across L3 ASes 14.

Often, the single entity that owns both of customer networks 16 wishes to provide network connectivity between customer networks 16 to one another. For example, customer network 16B may be a main campus network that includes a central database for storing accounting and other corporate level data. In this example, customer network 16A may be a network located in a different and often remote location from the main campus network represented by customer network 16B. In this example, the single entity that owns both of networks 16 may wish to provide network connectivity between the two remote customer networks and, more specifically may desire seamless connectivity as if networks 16 were directly connected by a physical link rather than being separated by multiple ASes 14.

To gain this type of connectivity, the single entity that owns both of customer networks 16 may choose to lease an exclusive physical link or line from each of the service providers that owns and operates ASes 14 to provide dedicated, uninterrupted, connectivity between customer networks 18. Example leased lines are commonly referred to as "T1-lines" or "T3-lines" depending upon the bandwidth requirements of the customer. Leasing of these links was usually expensive but guaranteed a sufficient amount of bandwidth to enable remote access of customer network 16B by customer network 16A. These forms of networks are often referred to as wide area networks (WANs). In this network configuration, the link provides a direct connection between customer networks 16, and CE devices 20 were generally unaware that the customer networks 16 were remote from one another. In other words, the leased link was transparent to CE devices 20 and customer networks 16 appeared to CE device 20 to be proximate to one another. This transparency facilitated administration of CE devices 20 in that CE devices 20 typically required no additional configuration to interface with the remote one of customer networks 16, respectively.

While the leased (or sometimes purchased) link enabled interconnection of remotely located customer networks 16 with the added benefit of transparency with respect to CE devices 20, such leased links were troublesome to administer from the perspective of the service providers who owned and operated ASes 14. Moreover, such links would often not be fully utilized at particular times of the day, e.g., late at night or early in the morning, and therefore represent network resources that could be employed if not subject to a restrictive lease or ownership agreement. The leased line, in effect, represented a dedicated wire connecting customer networks 16.

Service providers then sought ways to avoid leasing links within ASes 14 by providing a virtual wire service commonly referred to as a virtual private wire service (VPWS). The VPWS is a L2 service that provides point-to-point connectivity for a variety of L2 networks. The VPWS retains the characteristics of a leased link in that it was private and provided a dedicated virtual link for use only by customer networks 16 but did not require that any one physical link be dedicated to servicing the VPWS. Instead, the VPWS utilized a developing technology referred to as PWs, where a PW provides a form of connection that emulates a connection not natively supported by ASes 14.

To illustrate with respect to the example of FIG. 1, a PW may be configured such that L2 traffic from customer networks 16 can be carried across L3 ASes 14 without CE devices 20 can be configured as if the devices were otherwise directly connected by an physical link running the L2 protocol rather than being separated by L3 ASes 14. In other words, the VPWS relied on the PW technology to provide an emulated L2 connection across L3 ASes 14 such that the L3 nature of ASes 14 was transparent to CE devices 20, which is similar to the leased link. However, contrary to the leased link, the connection established by a PW does not restrict use of the underlying physical link solely for the use of traffic to and from customer networks 16. Instead, the PW may only consume a portion of a given physical link and, if such reserved portion is not currently being utilized, T-PE devices 18 may allocate that unused bandwidth to other traffic until such time as the bandwidth is once again required by customer networks 16.

In accordance with the techniques described in this disclosure, BRs 12 dynamically configure a PW across multiple domains, i.e., ASes 14 in this example. This form of PW may be referred to as a cross-AS PW. Rather than rely on static configuration, BRs 12 implement the techniques described in this disclosure to enable dynamic configuration of a cross-domain or, in this case cross-AS, PW. Moreover, BRs 12 implement the techniques of the disclosure to provide dynamic configuration of the cross-AS PW without requiring the ingress and egress devices of the cross-AS PW, e.g., T-PE devices 18, to implement extensions to BGP or any other border routing protocol that store data for configuring cross-domain PW or, in some instances, external BGP (eBGP) entirely. Instead, only BRs 12, which represent intermediate devices positioned between ingress and egress T-PE devices 18, need implement BGP in accordance with the techniques of the disclosure, thereby enabling this inter-AS PW without necessarily requiring that T-PE device 18 of the cross-PW implement BGP.

In operation, the techniques facilitate dynamic PW configurations in several different ways. The techniques are described with respect to a first example illustrated in FIG. 1 and a second example illustrated in FIG. 2. In the example of FIG. 1, BRs 12 implement the techniques of this disclosure to establish a form of cross-AS PW referred to as a multi-segment PW (MS-PW) that spans two or more ASes. This MS-PW is shown in the example of FIG. 1 as "MS-PW 22." MS-PW 22 comprises a first label distribution protocol (LDP) PW segment 24A (denoted as "seg 1"), a second LDP PW segment 24B (denoted as "seg 3") and a border gateway protocol (BGP) PW segment 26 (denoted as "seg 2").

To form MS-PW 22, T-PE device 18A discovers BR 12A via one of the protocols of a suite of protocols referred to generally as multi-protocol label switching (MPLS) protocols. Usually, T-PE device 18A discovers BR 12A via a label distribution protocol (LDP) of the MPLS suite of protocols. T-PE device 18A then establishes an LDP session with BR 12A, which is represented in FIG. 1 by the dashed line. T-PE device 18A then sends a label advertisement 28A in accordance with LDP to BR 12A. LDP advertisement 28A includes data for configuring LDP PW segment 24A. LDP advertisement 28A may comprise a forwarding equivalent class (FEC) element, which T-PE device 18A populates with data for configuring LDP PW segment 24A.

There are two commonly employed FEC elements for configuring PWs denoted as "FEC-128" and "FEC-129." FEC-129 supersedes FEC-128 and for this reason FEC-128 is often referred to as a "legacy FEC element." While FEC-128 is superseded by FEC-129, many T-PEs only support the legacy FEC-128. The techniques of this disclosure facilitate the configuration of cross-domain PWs using the legacy FEC-128 widely supported by T-PEs, while also supporting the configuration of cross-domain PWs using the FEC-129 signaling element.

Figure 7A:
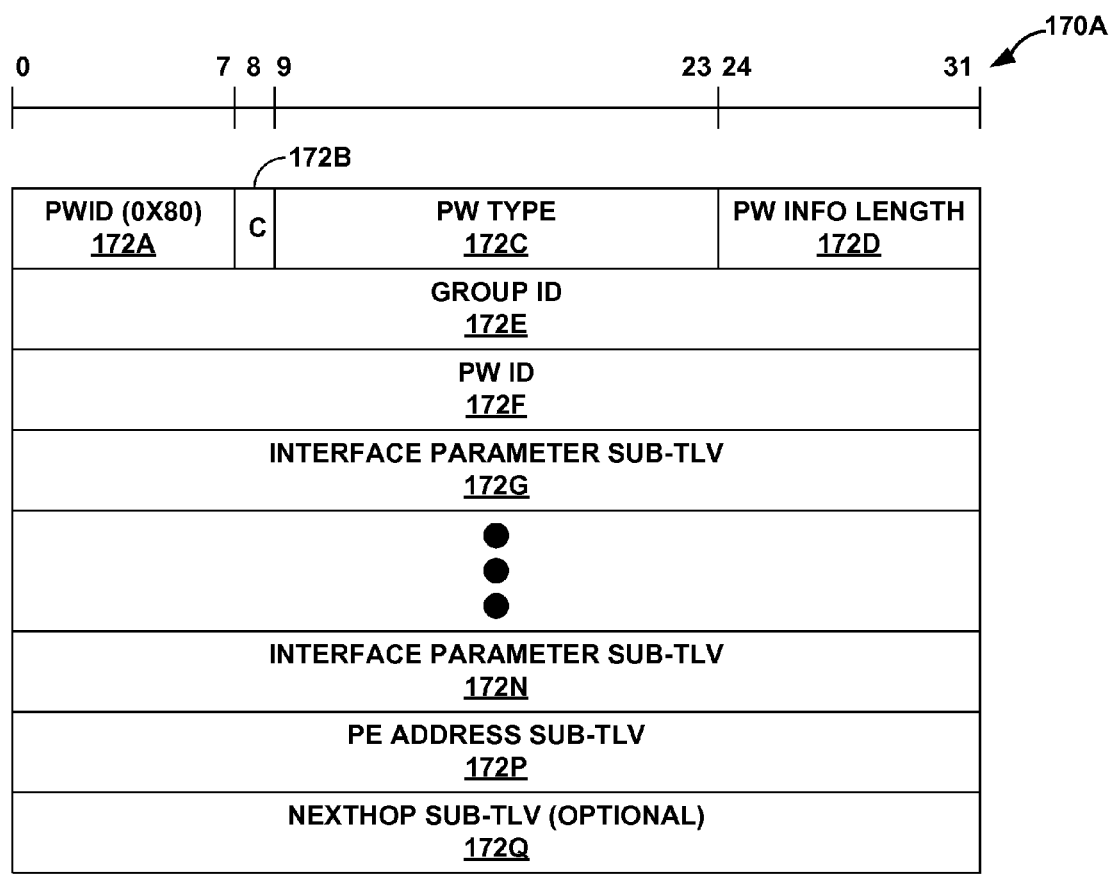
FIGS. 7A-7B are block diagrams illustrating exemplary FEC-128 and FEC-129 signaling elements, respectively.

A FEC-128 element includes a of $0x80_{16}$, which is $128_{10}$, hence the name "FEC-128." The FEC-128 signaling element also defines a PW type, a control word bit, a PW information length, a group identifier, another PW identifier, one or more interface parameter sub-type-value-length (sub-TLV) fields, a PE address sub-TLV and an optional nexthop sub-TLV field, each of which are described in more detail with respect to FIG. 7A. These sub-TLVs are considered sub-TLVs because the FEC-128 element is itself a TLV that T-PE 18A may append to any LDP message. Likewise, the FEC-129 element is also a TLV that T-PE 18A may append to any LDP message. A FEC-129 element includes a PW identifier of $0x81_{16}$, which is $129_{10}$, hence the name "FEC-129." The FEC-129 signaling element also defines a control bit, a PW type, a PW information length, an attachment group identifier (AGI) TLV, an attachment individual identifier (AII) TLV, a source AII (SAII) TLV, a target AII (TAII) TLV and an optional nexthop sub-TLV field, each of which are described in more detail below with respect to FIG. 7B. By way of example LDP advertisement 28A is described above as including either the FEC-128 or FEC-129 element, but any LDP message may include either of these TLV elements. Generally, each of the FEC-128 and FEC-129 elements define labels to be appended to traffic that traverses MS-PW 22.

Depending on whether T-PE device 18A supports FEC-128 or FEC-129 PW signaling, T-PE device 18A adds the FEC-128 or FEC-129 TLV to LDP advertisement 28A and then forwards LDP advertisement 28A to 8R device 12A. BR 12A receives LDP advertisement 28A in accordance with LDP from the T-PE device 18A. BR 12A parses LDP advertisement 28A to retrieve the data for configuring the first segment of the MS-PW, e.g., the FEC-128 or FEC-129 element, and transforms the data stored to the FEC-128 or FEC-129 element to conform to a format defined by another inter-domain network routing protocol, such as BGP. In particular, a new BGP network layer reachability information (NLRI) field may be defined to store the data of either the FEC-128 or FEC-129 element. BR 12A then forms a BGP message 30 by inserting the new NLRI field with the transformed data into BGP message 30. BR 12A then forwards BGP message 30 to BR 12B, which previously established a BGP session with BR 12A.

Upon receiving BGP message 30 with the new NLRI field, BR 12B extracts the transformed data from BGP message 30 and configures a second segment ("seg 2") of MS-PW 22 based on the extracted data, which is shown in the example of FIG. 1 as "BGP PW segment 26." While BR 12B configures the egress of BGP PW segment 26, BR 12A automatically stitches LDP PW segment 24A to the BGP PW segment 26, where "stitching" refers to configuring various interfaces of the forwarding plane of BR 12A to relay packets arriving via a first PW segment, e.g., LDP PW segment 24A, from the interface attached to the egress of the first segment to an interface attached to the ingress of the second segment, e.g., BGP PW segment 26. When used with respect to various operations of devices, the term "automatically" refers to operations carried out by the device that do not directly involve user input or intervention. For example, a user may initially configure BRs 12 to enable the automatic configuration of MS-PW 22, but the actual configuration, including the stitching of segments 24A, 24B ("segments 24") and 26, occur without the user specifically configuration or otherwise specifying the parameters of the configuration. BRs 12 automatically determine the appropriate configuration data and configure various interfaces with the configuration data to define the stitching of segments 24 and 26 to one another.

After configuring BGP PW segment 26, BR 12B further converts this extracted data back into its original form, generates an LDP message 28B (e.g., a LDP advertisement 28B) that includes the original data in the form of either a FEC-128 or FEC-129 element inserted into the LDP advertisement 28B and forwards LDP advertisement 28B with either the FEC-128 or FEC-129 element to T-PE device 18B. BR 12B then begins automatically stitching LDP PW segment 24B to BGP PW segment 26.

Upon receiving LDP advertisement 28B, T-PE device 18B parses received LDP advertisement 28B to extract the data stored to either the FEC-128 or FEC-129 element and configures a third segment ("seg 3") of MS-PW 22, which is shown in the example of FIG. 1 as "LDP PW segment 24B." Both of T-PE devices 18 may also "stitch" the respective ones of segments 24 to interfaces connected to respective CE devices 20. This form of stitching may be referred to as stitching the respective ones of segments 24 to an attachment circuit, which is defined in the above incorporated RFC 3985 as either a physical or virtual circuit attaching a CE to a PE. Example attachment circuits (ACs) include a frame relay data-link connection identifier (DLCI), an asynchronous transfer mode (ATP) virtual path identifier (VPI)/virtual circuit identifier (VCI), an Ethernet port, a virtual local area network (VLAN), a point-to-point protocol (PPP) connection on a physical interface, a PPP session from a layer 2 tunneling protocol (L2TP) or an MPLS LSP. Attachment circuits are shown in the example of FIG. 1 as attachment circuits 32A, 32B ("attachment circuits 32").

In some examples, each of T-PE devices 18 are only aware of adjacent PW segments 24 and are not aware of BGP PW segment 26 or those of PW segments 24 to which each of T-PE devices 18 are not directly connected. In this respect, MS-PW 22 appears as a single segment PW to each of T-PE devices 18 and the multi-segment nature of MS-PW 22 is transparent to T-PE devices 18. This transparency arises due to the automatic conversion of the LDP FEC elements to NLRI fields by BRs 12 as the use of the BGP NLRI only conveys the FEC elements and none of the other data associated with LDP, which results in what may be referred to a break in LDP visibility. This break in LDP visibility and the resulting transparency also facilitates a form of interworking that enables a T-PE device that only supports a particular form of FEC signaling, e.g., FEC-128 signaling, to form a MS-PW across ASes with another T-PE device that only supports a different form of FEC signaling, e.g., FEC-129 signaling, that is usually not compatible with the other form of FEC signaling. In this way, the automatic conversion of FEC data to fit an NLRI field and the following automatic conversion of the NLRI field data back to FEC data facilitates signaling between two different forms of FEC signaling.

In any event, after provisioning or otherwise configuring each of segments 24, 26, stitching these various segments 24, 26 together to form MS-PW 22 and stitching resulting MS-PW 22 to attachment circuits 32B, T-PE device 18B receives data units, e.g., Ethernet frames, from CE device 20B of customer network 16B. T-PE device 18B encapsulates these frames with header data identifying a tunnel and LDP PW segment 24B. This header data comprises a tunnel label and a PW label, where the tunnel label is often referred to as the "outer label" while the PW label is typically referred to as the "inner label" because the tunnel label encapsulates the PW label. While not described above in detail, one or more tunnels to carry MS-PW 22 across the network are usually signaled, where the resulting one or more tunnels carries or supports one or more PWs. In the instance of MS-PW 22, a tunnel for each of segments 24, 26 are signaled to carry each of PW segments 24, 26. The tunnels may be configured beforehand and defined for use in automatic configuration of cross-domain PWs or may be dynamically configured by T-PE devices 18 and BRs 12 automatically. In any event, the tunnels may be configured in advance and provisioned for use by the automatic cross-domain PW configuration techniques described in this disclosure. The tunnels may be signaled using, for example, a L2TP, LDP, and/or a traffic engineering extension to a resource reservation protocol (RSVP), which is denoted as RSVP-TE. After appending this header data to the Ethernet frame, T-PE device 18B forwards this encapsulated frame to BR 12B.

Upon receiving the encapsulated frame, BR 12B replaces the tunnel label in the header data with another tunnel label identifying the tunnel configured between BRs 12 and the PW label of the header data with the PW label associated with BGP PW segment 26. BR 12B then forwards this encapsulated frame to BR 12A, which proceeds to replace the tunnel label in the header data with yet another tunnel label identifying the tunnel configured between BR 12A and T-PE device 18A and the PW label in the header data with the PW label associated with LDP PW segment 24A. BR 12A forwards the encapsulated frame to T-PE device 18A, which decapsulates the Ethernet frame and forwards the decapsulated Ethernet frame via stitched AC 32A to CE device 20A of customer network 16A.

In this manner, the techniques facilitate configuration of a cross-domain PW, e.g., MS-PW 22, without requiring T-PE devices 18 to necessarily implement BGP, or more specifically, BGTP auto-discovery. Instead, T-PE devices 18 are required, for example, to support LDP or some other similar MPLS protocol. Moreover, T-PEs 18 are not limited to a particular form of LDP FEC signaling to configure a cross-domain PW, but may implement either FEC-128 or FEC-129 signaling. Furthermore, as noted above, the techniques facilitate automatic configuration of cross-domain PWs without requiring both the ingress and egress T-PE to support the same form of FEC-128 or FEC-129 signaling. The techniques also promote BGP signaling to form cross-domain PWs between BRs 12, thereby avoiding any need of BRs 12 to form LDP sessions between BRs 12. By not requiring BRs 12 to form LDP sessions with one another, BRs 12 may be more easily administered considering that BRs 12 are often required to form BGP sessions between one another but not LDP sessions. Consequently, BRs 12 can make use of existing policy engines for negotiating connections across the BGP session and the single BGP may be easier to trace, provision and test when compared to having to trace, provision and test both BGP and LDP.

Figure 2:
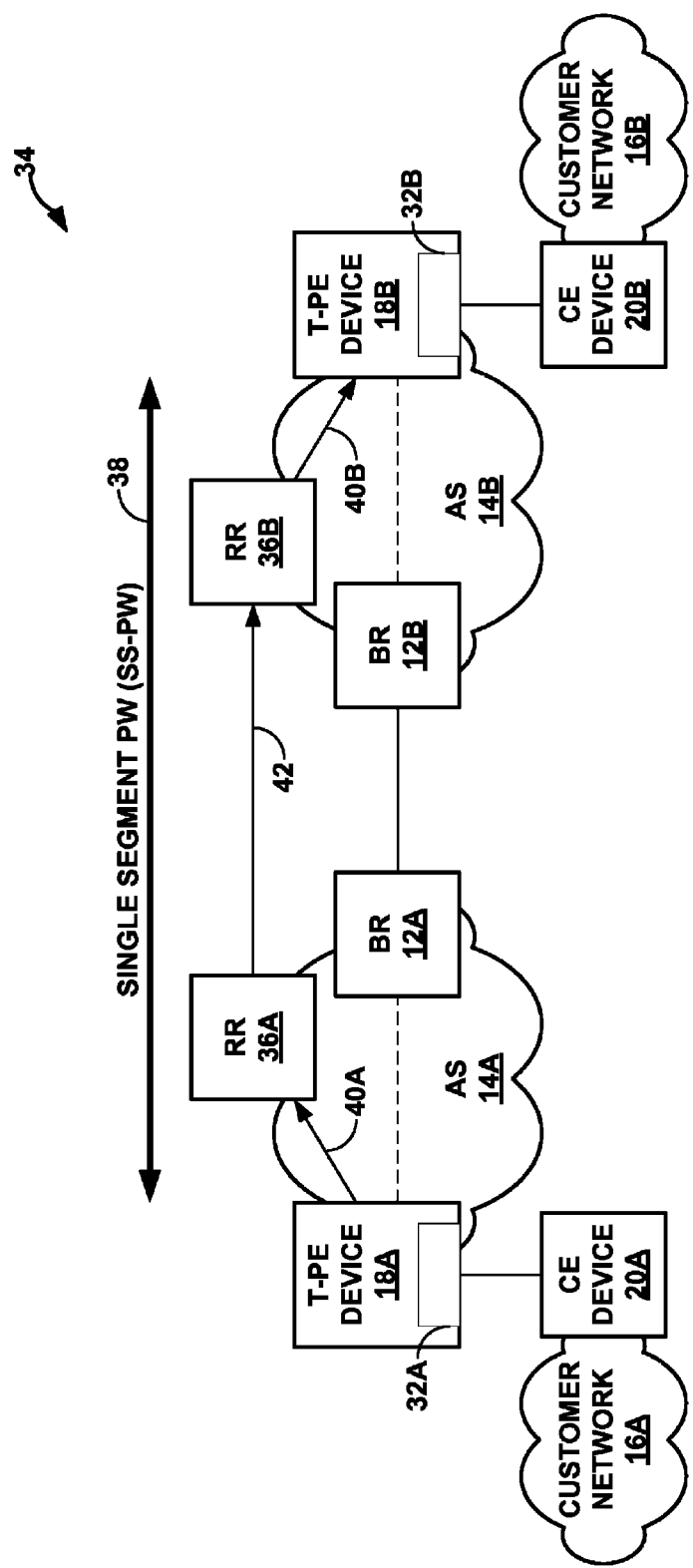
FIG. 2 is a block diagram illustrating another system in which various devices implement the techniques of this disclosure to dynamically configure a cross-domain pseudowire (PW).

FIG. 2 is a block diagram illustrating another system 34 in which various devices implement the techniques of this disclosure to dynamically configure a cross-domain pseudowire (PW). System 34 is similar to system 10 of FIG. 1, except that each of ASes 14 in FIG. 2 further include a respective one of route reflectors (RRs) 36A, 36B ("RRs 36"). Route reflectors 36 each comprise a network device that interfaces with each router that implements BGP, such as BRs 12, to improve scalability with respect to BGP implementations within a given domain, such as one of ASes 14. RRs 36 generally negate the full-mesh requirement of BGP that requires each router of a given domain that implements BGP to establish a BGP connection with every other router of the given domain that implements BGP. Instead, RRs 36 establish a connection with each of the routers that implement BGP in the given domain by which to receive BGP messages, such as route advertisements, from these routers and redistribute or reflect these route advertisements to every other one of the routers in the given domain that implement BGP. Consequently, RRs 36 are often employed in large networks to improve scalability by negating the full-mesh requirement that is often burdensome to configure, troubleshoot and otherwise maintain. More information regarding route reflectors and their various uses and features can be found in RFC 1996, entitled "BGP Route Reflection An Alternative to full mess IBGP," dated June 1996, which is herein incorporated by reference as if set forth in its entirety. Although shown as outside the data path, RRs 36 may reside in the data path and, in these instances, may perform operations similar to that described above with respect to BRs 12 of FIG. 1.

In most other respects, system 34 is similar to system 10 of FIG. 1 in that system 34 includes similar, if not substantially the same, devices and configuration of networks. To illustrate both of systems 10, 34 include ASes 14 comprising BRs 12 and T-PE devices 18, where T-PE devices 18 are connected to a respective one of BRs 12 and BRs 12 couple to each other. Moreover, both of system 10, 34 include customer networks 16, each of which comprise CE devices 20 that couple to respective ones of T-PE devices 18.

The addition of RRs 36 in system 34 however results in a different type of cross-domain PW in that the cross-domain PW comprises a single segment (SS) PW 38 ("SS-PW 38") rather than MS-PW 22. With respect to SS-PW 38, both of T-PE devices 18 are aware of one another (or discover one another), form an end-to-end tunnel between each other and then configure SS-PW 38 within the end-to-end tunnel. To illustrate, T-PE device 18 establishes a targeted LDP session with RR 36A and forwards an LDP message 40A, such as an LDP advertisement, that includes either a FEC-128 or FEC-129 element storing data for configuring SS-PW 38. RR 36 receives LDP message 40A and transforms the data stored to the FEC-128 or FEC-129 element such that it can be stored to the BGP NLRI field described above. RR 36A also embeds in the NLRI field an address assigned to T-PE device 18A, such as a L3 IP address. RR 36A then generates a BGP message 42 with the BGP NLRI field and floods this BGP message 42 to all other RRs over external BGP (EBGP), which is a form of BGP used to communicate between domains, such ASes 14.

Assuming RR 36B receives flooded BGP message 42, RR 36B parses BGP message 42 to extract the NLRI field storing the data for configuring SS-PW 38 and translates this data such that it can be stored to a FEC-128 or FEC-129 field of LDP message 40B. RR 36B also determines the address assigned to T-PE device 18A from the NLRI field and generates LDP message 40B with another address TLV that stores the address assigned to T-PE device 18A. RR 36B has previously established or establishes a target LDP session with T-PE device 18B and RR 36B forwards LDP message 40B via this targeted session. T-PE device 18B receives LDP message 40B and extracts the data to configure SS-PW 38 from the FEC-128 or FEC-129 element of LDP message 40B as well as the address of T-PE device 18B from the address TLV of LDP message 40B. Using the address stored to the address TLV, T-PE device 18B discovers T-PE device 18A and forms the tunnel via one of the above tunneling protocols listed above. T-PE devices 18 may, for example, form an LDP tunnel via LDP. T-PE devices 18 then form SS-PW 38 over the established tunnel.

After forming SS-PW 38, T-PE device 18A may receive an Ethernet frame from CE device 20B, whereupon T-PE device 18A encapsulates the Ethernet frame with header data that includes the tunnel label and the PW label, which again may be referred to as the "outer label" and "inner label," respectively. T-PE device 18A forwards this encapsulated frame to BR 12B, which only replaces the outer label with a different tunnel label used to tunnel packets between BRs 12. BR 12B forwards the encapsulated packet to BR 12A, which similar to BR 12B replaces only the outer tunnel label with another tunnel label for tunneling packets between T-PE device 18A and 8R 12A. BR 12A forwards the encapsulated frame to T-PE device 18A, which decapsulates the frame and forwards the frame via the stitched AC 32A to CE device 20A. As the inner PW label does not change, the resulting PW may be considered to have only one segment, hence the name "single segment PW 38."

In this respect, the techniques of this disclosure provide two ways by which to establish cross-domain PWs 22, 38 without necessarily requiring T-PE devices 18 to implement BGP. The first way illustrated with respect to system 10 of FIG. 1 may be referred to as "option (b)" in that it resembles signaling in an option (b) of RFC 4364, which describes BGP/MPLS IP virtual private networks (VPNs). More specifically, section 10 of RFC 4364 sets out the option (b) signaling of routes between VPN sites, such as customer networks 16. The second way illustrated with respect to system 34 of FIG. 2 may be referred to as "option (c)" in that it resembles signaling in an option (c) set forth in section 10 of RFC 4364. More information regarding these options (b) and (c) as well as general information regarding signaling across domains, as well as, within domains can be found in RFC 4364, entitled "BGP/MPLS IP Virtual Private Networks (VPNs)," dated February 2006, the entire contents of which are herein incorporated by references as it set forth in its entirety.

In some instances, only half of the VPWS is provisioned in that resulting MS-PW 22 and SS-PW 38 are unidirectional from T-PE device 18B to T-PE device 18A. Another MS-PW 22 and SS-PW 38, respectively, may be formed from T-PE device 18A to T-PE device 18B in accordance with the techniques described in this disclosure thereby provisioning the entire VPWS for full connectivity between customer networks 16. While only the first half of the provisioning of VPWS is described above, the techniques should not be limited in this respect, but may include provisioning two or more PWs to establish full connectivity between customer networks 16.

Figure 3A:
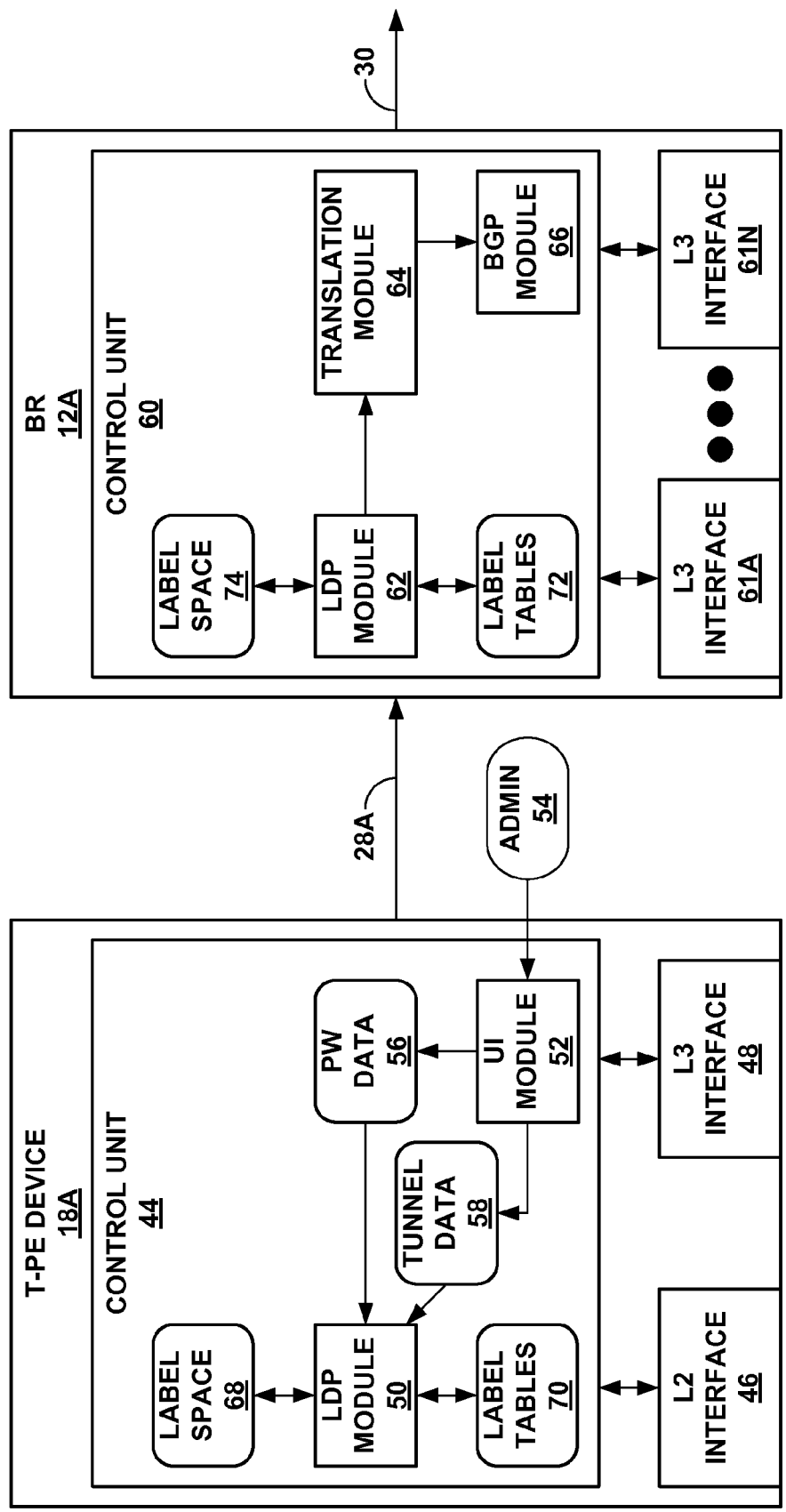
FIGS. 3A, 3B are block diagrams illustrating the system of FIG. 1 in more detail.
Figure 3B:
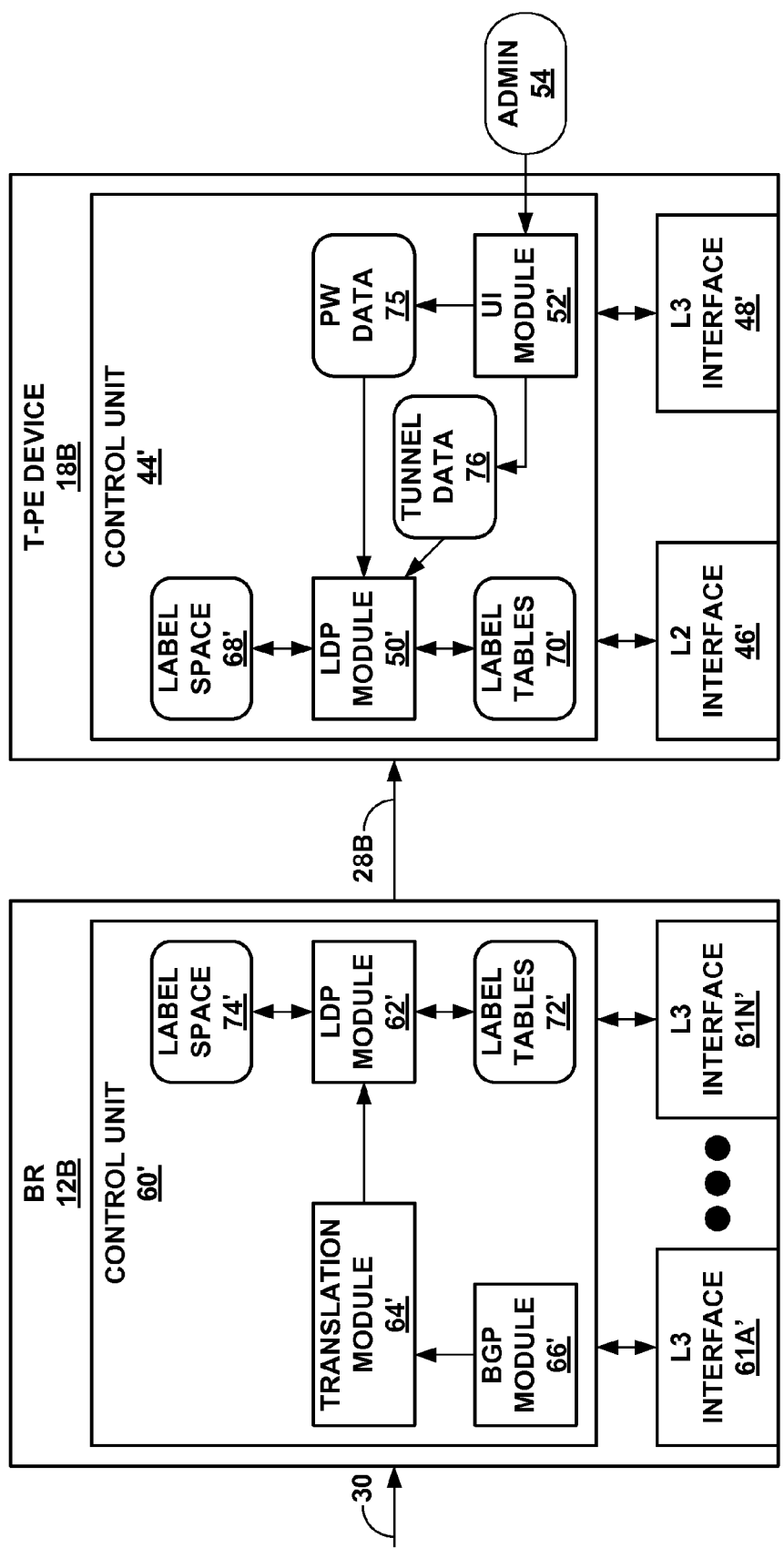

FIGS. 3A, 3B are block diagrams illustrating system 10 of FIG. 1 in more detail. More specifically, FIG. 3A is a block diagram illustrating T-PE device 18A and 8R 12A of the example of FIG. 1 in more detail, while FIG. 3B is a block diagram illustrating BR 12B and T-PE device 18B of the example of FIG. 1 in more detail. Referring first to FIG. 3A, T-PE device 18A comprises a control unit 44, at least one L2 interface 46 and at least one L3 interface 48.

Control unit 44 of T-PE device 18A may generally represent hardware, which in some instances may execute software in the form of instructions stored to a computer readable medium. For example, control unit 44 may comprise any combination of one or more of processors, Application Specific Integrated Circuits (ASICs), integrated circuits or any other processing or control unit or element or combination thereof, and a memory or storage device. In some instances, the memory or storage device (e.g., generally, a computer-readable storage medium) may comprise the above described instruction that cause the programmable processor to perform the techniques described herein. These instructions may form a computer or software program or other executable module that the programmable processor executes to perform the functionality described herein, including the functionality attributed to the techniques of this disclosure.

Control unit 44 includes LDP module 50 and user interface (UI) module 52 ("UI module 52"). LDP module 50 represents hardware, which in some instances executes software, to implement LDP. More specifically, LDP module 50 generates LDP message 28A such that LDP message 28A includes data for configuring MS-PW 22 in the form of either a FEC-128 or FEC-129 element, as described above. UI module 52 represents hardware, which in some instances executes software, to present an interface with which a user, such as administrator 54 ("admin 54"), may interact to specify configuration data, such as PW configuration data 56 ("PW data 56") and tunnel configuration data 58 ("tunnel data 58"). PW data 56 specifies various data for configuring a cross-domain PW, such as MS-PW 22 or SS-PW 38, while tunnel data 58 specifies various data for configuring a label switched path (LSP) that carries the cross-domain PW, e.g., MS-PW 22 or SS-PW 38.

L2 interface 46 comprises an interface for coupling to a network device of a L2 network, such as CE device 20A of customer network 16A. Attachment circuit 32A of FIG. 1 may be represented by L2 interface 46, although not limited to such an interface 46 as noted above. L3 interface 48 comprises an interface for coupling to a network device of a L3 network, such as another router, including BR 12A. In some examples, L3 interface 48 may not directly connect to BR 12A but may instead connect to an intermediate router positioned between BR 12A and T-PE device 18A. While not shown for ease of illustration purposes, T-PE device 18A may comprise two or more L2 interfaces 46 and two or more L3 interfaces 48 and the techniques should not be limited in this respect to the example shown in FIG. 3A.

BR 12A also includes a control unit 60 that is similar to control unit 44, as well as, L3 interfaces 61A-61N ("L3 interfaces 61") that are similar to L3 interface 48. Control unit 60 includes an LDP module 62 that is similar to LDP module 50, a translation module 64 and a BGP module 66. Translation module 64 represents hardware, which in some instances executes software, to translate data stored to a FEC-128 or FEC-129 element to generate translated data capable of being stored to a BGP NLRI. BGP module 66 represents hardware, which in some instance executes software, to implement BGP so as to generate BGP message 30 in a manner that includes the BGP NLRI for storing the translated data. L3 interfaces 61 may be substantially similar to L3 interface 48.

Initially, admin 54 interfaces with UI module 52 of control unit 44 included within T-PE device 18A so as to define PW configuration data 56 and tunnel configuration data 58. PW configuration data 56 may comprise data for populating the various aspects of a FEC-128 or FEC-129 element, which are described below in more detail. Tunnel configuration data 58 may comprise data for establishing a tunnel, or in this case, a LSP between T-PE device 18A and T-PE device 18B. Tunnel configuration data 58 may for example specify a destination address of T-PE device 18B, as well as, various other parameters related to quality of service (QoS) and other routing concerns.

In response to data 56, 58, LDP module 50 forms targeted LDP session with BR 12A, if not previously established, and signals the LSP in accordance with tunnel configuration data 58. Hereinafter it is assumed that LDP module 50 forms a tunnel that encapsulates MS-PW 22 in accordance with a tunneling protocol, such as LDP. LDP module 50 also signals LDP PW segment 24A of MS-PW 22 in accordance with PW data 56 across this targeted LDP session to BR 12A. Both the signaling of the tunnel and PW segment 24A may occur via the same LDP message, e.g., LDP message 28A, or a different LDP message, where LDP message 28A in this instance signals LDP PW segment 24A. LDP module 50 may reserve labels in its label space 68 for use by PW segment 24A and update label tables 70 to reflect the reservation of labels for the tunnel and PW segment 24A. The corresponding entries of label tables 70 specifying the reservation may also define an action, such as popping a label off of the label stack included in the header data of encapsulated packets, pushing a label onto the label stack or swapping a label of the label stack with another label. L3 interface 48 forwards LDP message 28A to 8R 12A.

While LDP module 50 of T-PE device 18A forms the tunnel and LDP PW segment 24A through updating label tables 70, LDP module 22 of BR 12A receives LDP message 28A. Assuming the message only signals LDP PW segment 24A, LDP module 62 parses LDP message 28A to extract the PW configuration data stored to either the FEC-128 or FEC-129 element and the PW label, where PW configuration data may refer to both the PW label and the configuration data, e.g., target attachment circuits, source attachment circuits, and attachment circuit group. In some instances, LDP module 62 may include a global configuration policy, which it applies to LDP message 28A that include FEC-128 or -129 elements to determine from which T-PE device it will accept PW connections. LDP module 62 configures LDP PW segment 24A by updating label tables 72 with the PW label signaled parsed PW configuration data. LDP module 62 then reserves a label for BGP PW segment 26 between BRs 12 in label space 74 and updates label tables 72 to begin configuring BGP PW segment 26. LDP module 62 also forwards the PW configuration data extracted from either the FEC-128 or FEC-129 element to translation module 64.

Translation module 64 translates the forwarded data to generate translated data, where this translated data conforms to the BGP NLRI shown below with respect to FIG. 8. Translation module 64 forwards this translated data to BGP module 66, which adds a route target (RT) that uniquely maps to the attachment group identifier (AGI) specified in the data stored to the FEC-129 element. Alternatively, in the context of a FEC-128 element, BGP module 66 constructs a RT using the IPv4 address format to encode the target PE address. BGP module 66 also generates BGP message 30 so as to include the data in the form of the BGP NLRI and the label assigned to BGP PW segment 26. In some examples, BGP module 66 sets itself as the next hop in BGP message 30. One of L3 interfaces 61 then forwards BGP message 30 to BR 12B usually by flooding BGP message 30 using an external border gateway protocol (EBGP).

Referring to FIG. 3B, BR 12B and T-PE device 18B are substantially similar to BR 12A and T-PE device 18A, however, for denoting the different modules between these similar devices, the same modules of BR 12B and T-PE devices 18B have a prime (') next to each number for ease of reference. Despite the different notations, which again are only for ease of reference purposes, the modules of BR 12B and T-PE device 18B are substantially similar to those described above with respect to BR 12A and T-PE device 18A.

In any event, BGP module 66' receives BGP message 30 via one of L3 interfaces 61A'-61N' ("interfaces 61'"). BGP module 66' parses the BGP NLRI from BGP message 30 and forwards the data stored to the BGP NLRI to translation module 64'. Translation module 64' translates this data such that the data corresponds to the format of either a FEC-128 or FEC-129 element. Translation module 64' forwards this translated data to LDP module 62', which proceeds to generate LDP message 28B. Specifically, LDP module 62' reserves a label for a label for LDP PW segment 24B between BR 12B and T-PE device 18B in label space 74'. LDP module 62' updates label tables 72' in the manner described above to begin configuring PW segment 24B. LDP module 62' then generates LDP message 28B to include the data for configuring LDP PW segment 24B in the form of a FEC-128 or FEC-129 element, where this data for configuring the PW may include the reserved PW label. In the context of a FEC-128 element, LDP module 62' extracts the PE address from the SAI and encodes it using the PE address sub-TLV described below in more detail. With regard to either the FEC-128 or FEC-129 element, LDP module 62' optionally sets the nexthop sub-TLV, which is also described in more detail below. One of L3 interfaces 61' then forwards LDP message 28B to T-PE device 18B.

L3 interface 48' of T-PE device 18B receives LDP message 28A, whereupon LDP module 50' parses LDP message 28A to extract the data for configuring LDP PW segment 24B. LDP module 50' updates label tables 70' in accordance with this parsed data for configuring LDP PW segment 24B. In the context of a FEC-128 element, LDP module 50' uses the data stored to the PE address sub-TLV to augment the FEC and thereby make the FEC more unique. In this manner, a MS-PW 22 from T-PE device 18A to T-PE device 18B may be formed in accordance with the techniques of this disclosure. As noted above, another MS-PW from T-PE device 18B to T-PE device 18A may be configured so as to enable full connectivity in both directions between T-PE devices 18. Admin 54 may interface with UI module 52' of T-PE device 18B to define both PW data 75 and tunnel data 76, which propagates across the network via various messages similar to LDP messages 28 and BGP message 30 to form the other MS-PW connecting T-PE device 18B to T-PE device 18A for delivery of traffic from customer network 16B to customer network 18A.

T-PE device 18B may then receive an Ethernet frame from CE device 20B via the attachment circuit represented by L2 interface 46'. T-PE device 18B has since stitched the attachment circuit or L2 interface 46' to LDP PW segment 24B in label tables 70 to establish MS-PW 22. Also, BRs 12 and T-PE device 18A may also have stitched the various PW segments 24, 26 and attachment circuits, e.g., L2 interfaces 46, 46', together to form MS-PW 22 by updating respective label tables 70, 70', 72 and 72'. The stitching of an AC to a LDP PW segment 24B may resemble, for example, updating an entry to specify that frames received via a particular AC, such as L2 interface 46', should be encapsulated with an LDP header having a label stack. Moreover, the entry may designate that a tunnel label and a PW label specified by BR 12B via LDP message 28B should be pushed onto the label stack.

Upon receiving the frame from CE device 20B, LDP module 62' accesses one or more label tables 72 to locate the appropriate entry for the frame. Upon locating the appropriate or corresponding entry via a lookup based on a destination address specified by the received Ethernet frame, LDP module 62' performs the actions listed by the entry, which in this instance comprise encapsulating the received frame to define at least a label stack and pushing the PW label followed by the tunnel label onto the label stack of the encapsulated frame. LDP module 62' then forwards the encapsulated frame via L3 interfaces 48' to BR 12B.

LDP module 62' of BR 12B receives the encapsulated frame, performs a lookup in one or more label tables 72' based on the labels in the label stack to locate an entry associated with the received labels. The located entry defines two swap actions that swap the outer tunnel label and the inner PW label with the tunnel label and PW label signaled by BR 12A. LDP module 62' then forwards this encapsulated frame via one of L3 interface 61' to BR 12A, which receives the encapsulated frame. In particular, LDP module 62 receives the encapsulated frame and performs substantially the same operations as that of LDP module 62' of BR 12B. LDP module 62 forwards the encapsulated frame to T-PE device 18A via one of L3 interfaces 61. LDP module 50 of T-PE device 18A receives the encapsulated frame via L3 interface 48 and performs a lookup in label tables 70 based on the labels in the label stack of the header of the encapsulated frame to locate the appropriate entry. The located entry defines at least one action to decapsulate the encapsulated frame, where two or more actions may be defined to pop the tunnel and PW labels respectively. After performing these actions, LDP module 50 forwards the decapsulated frame via the attachment circuit specified in the located entry, e.g., L2 interface 46.

Figure 4:
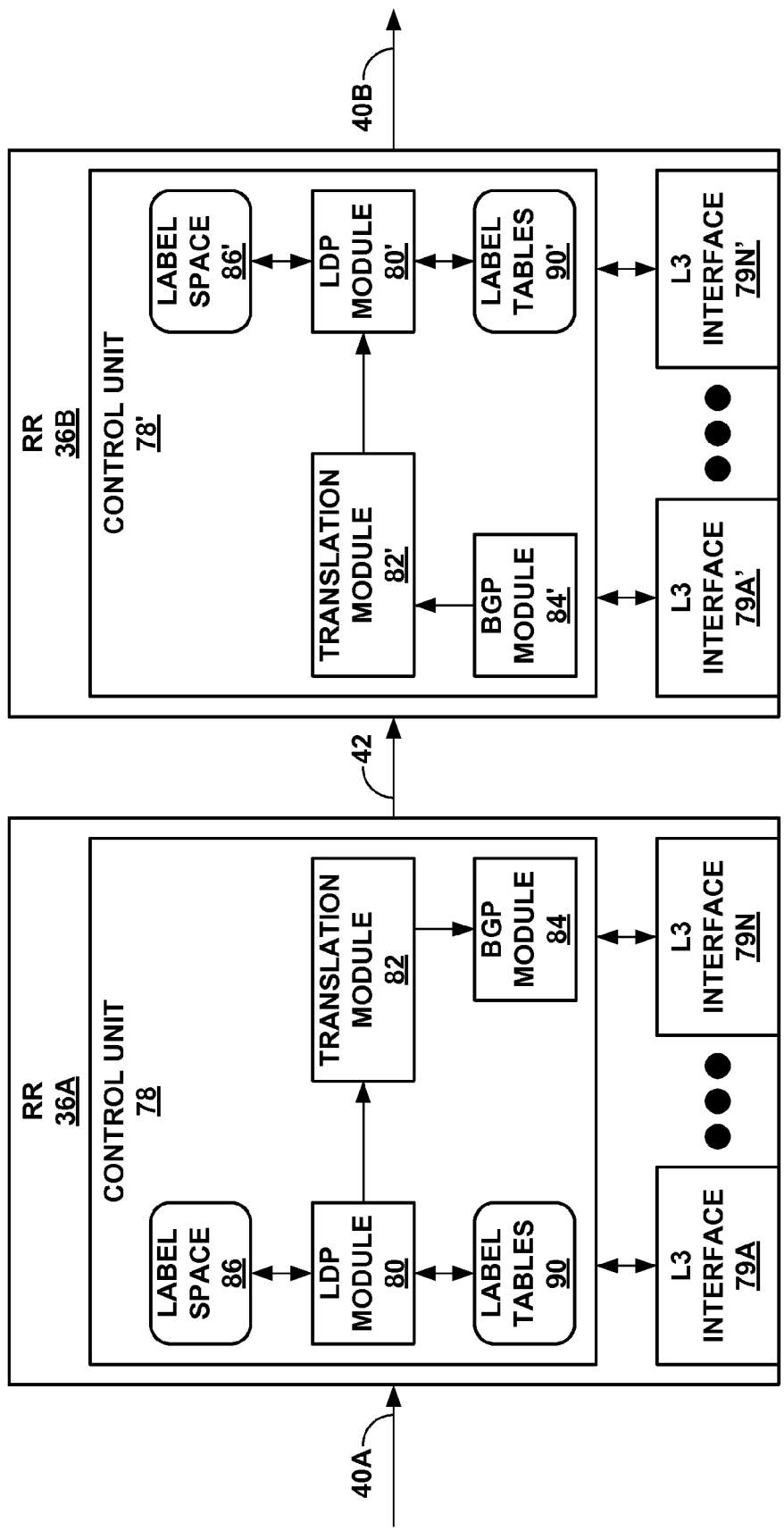
FIG. 4 is a block diagram illustrating the route reflectors of FIG. 2 in more detail.

FIG. 4 is a block diagram illustrating route reflectors 36 of FIG. 2 in more detail. RRs 36 are substantially similar to BRs 12 in that each of RRs 36 include similar control units 78, 78' comprising LDP modules 80, 80', translation modules 82, 82' and BGP modules 84, 84' as that of BRs 12, respectively. RRs 36 are also similar to BRs 12 in that RRs 36 also include similar L3 interfaces 79A-79N, 79A'-79N' as that of BRs 12. In most respects, RRs 36 function similar to BRs 12, except that RRs 36, and more specifically, LDP module 80 of RR 36A does not set itself as the next hop in BGP message 42. Instead of setting itself as the next hop, RR 36A sets the next hop as T-PE device 18A, which in effect configures the resulting cross-domain PW as a single segment PW, which is represented in the example of FIG. 2 as SS-PW 38.

Figure 5A:
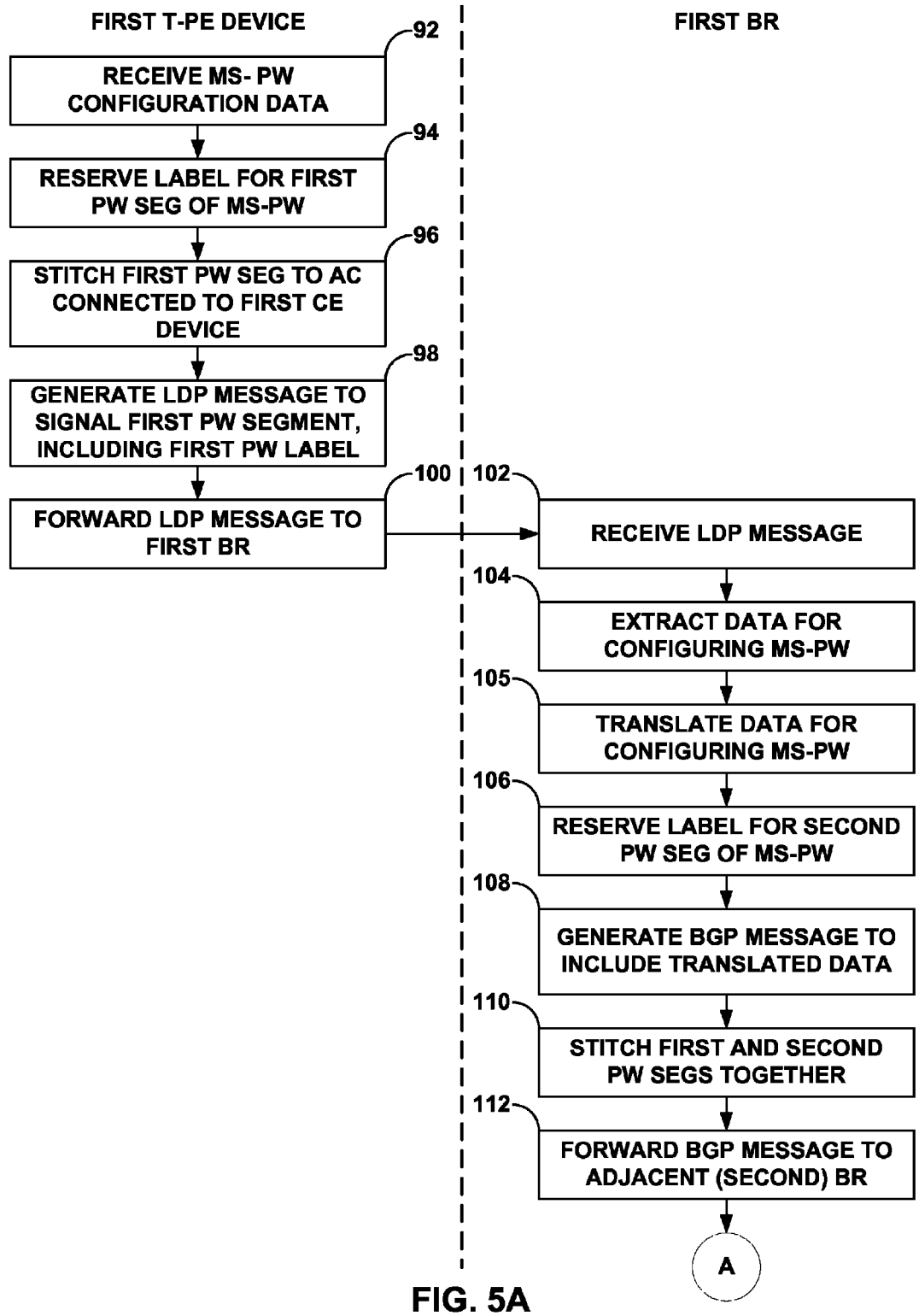
FIGS. 5A, 5B are flowcharts illustrating example operation of a system of network devices in implementing the techniques of this disclosure to automatically configure a cross-domain PW.
Figure 5B:
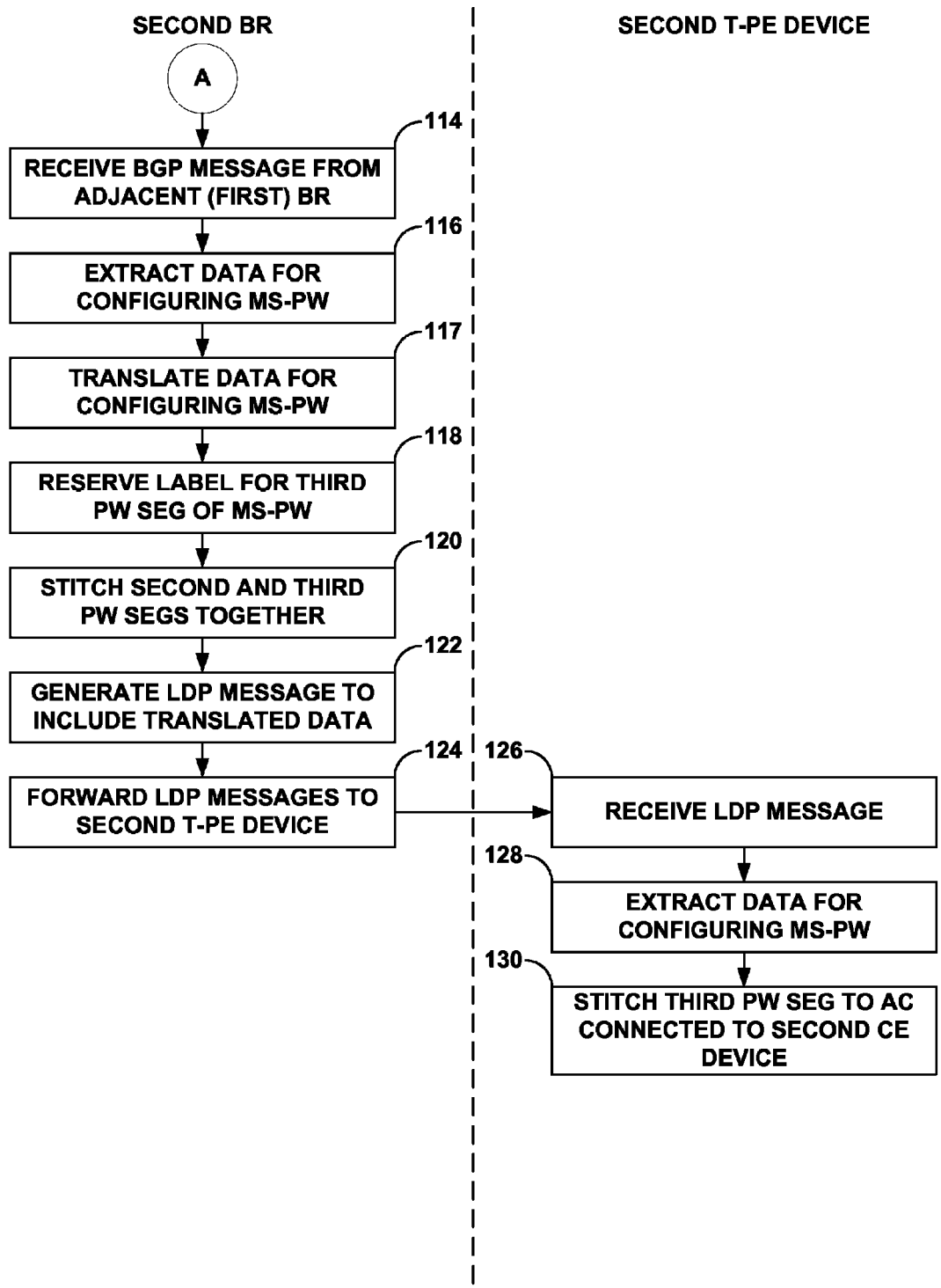

FIGS. 5A, 5B are flowcharts illustrating example operation of a system of network devices, such as T-PE devices 18 and BRs 12 of FIGS. 3A, 3B, in implementing the techniques of this disclosure to automatically configure a cross-domain PW, such as MS-PW 22 shown in the example of FIG. 1. While described with respect to T-PE devices 18 and BRs 12 of FIG. 3A, 3B, the techniques set forth in the flowchart of FIG. 5A, 5B may be implemented by any type of network device, including switches, hubs, DSLAMs, cable modem termination systems (CMTSes), and wireless access points (WAPs).

Referring first to the example of FIG. 5A, initially an administrator, such as admin 54 of FIGS. 3A, 3B, may interface with UI module 52 of T-PE device 18A to define PW data 56. Admin 54 may also interface with UI module 52 to initiate the automatic configuration MS-PW 22 shown in FIG. 1. Thereafter, admin 54 need not perform any other operations and T-PE devices 18 and BRs 12 automatically configure MS-PW 22 in accordance with the techniques described in this disclosure. For ease of illustration purposes, it is assumed below that the one or more tunnels that encapsulate MS-PW 22 has been previously established.

UI module 56 of control unit 44 included within T-PE device 18A therefore receives PW data 56, which defines data for configuring MS-PW 22, and the initiation by admin 54 to begin the automatic configuration of MS-PW 22 (92). In response to this initiation, UI module 54 forwards PW data 56 to LDP module 50. LDP module 50 proceeds to reserve a label in label space 68 for use by LDP PW segment 24A, which also represents the first segment of MS-PW 22 (94). LDP module 50 then updates label tables 70 so as to stitch LDP PW segment 24A to the AC connected to CE device 20A, e.g., L2 interface 46, as described above (96). LDP module 50 also generates LDP message 28A to signal PW data 56 and the label reserved for first PW segment 24A of MS-PW 22 via either a FEC-128 or FEC-129 element, as described above (98). LDP module 50 forwards LDP message 28A to 8R 12A via L3 interface 48 (100).

One of L3 interfaces 61 of BR 12A receives LDP message 28A and forwards message 28A to LDP module 62 of control unit 60 included within BR 12A (102). LDP module 62 parses LDP message 28A to extract the PW data 56 and the label reserved for the first PW segment 24A stored to either the FEC-128 or FEC-129 element (104). After extracting this data and label, LDP module 62 forwards the data for configuring MS-PW 22 to translation module 64, which translates this data into a format that conforms to the BGP protocol (105). LDP module 62 also accesses label space 74 to reserve a label for BGP PW segment 26, which is the second PW segment of MS-PW 22 (106). BGP module 66 receives the translated data from translation module 64 and generates BGP message 30 to include an NLRI that stores the translated data, as described above (108). LDP module 62 updates label tables 72 to stitch LDP PW segment 24A to BGP PW segment 26 in the manner described above, while BGP module 66 forwards BGP message 30 to adjacent BR 12B (110, 112).

Referring to FIG. 5B, BR 12B receives BGP message 30 via one of L3 interfaces 61', whereupon BGP module 66' extracts the data stored to the NLRI for configuring MS-PW 22 (114, 116). BGP module 66' then forwards the extracted data to translation module 64', which translates the extracted data back to a format that conforms to the LDP FEC-128 or FEC-129 elements (117). Translation module 64' forwards the translated data to LDP module 62'. In response to this translated data, LDP module 62' access label space 74' to reserve a label for LDP PW segment 24B, which represents a third segment of MS-PW 22, while also stitching the second and third PW segments, e.g., BGP PW segment 26 and LDP PW segment 24B, together within label tables 70', as described above (118, 120). Also in response to receiving the translated data, LDP module 62' generates LDP message 28B to include the translated data in the form of either a FEC-128 or FEC-129 element (122). LDP module 62' forwards LDP message 28B to T-PE device 18B via one of L3 interfaces 61' (124).

T-PE device 18B receives LDP message 28B via L3 interface 48', where LDP module 50' extracts the data for configuring MS-PW 22 from either the FEC-128 or FEC-129 element, as described above (126, 128). LDP module 50' then access label tables 70' to stitch LDP PW segment 24B to the AC to which CE device 20B is connected, e.g., L2 interface 46', in the manner described above (130). In this way, T-PE devices 18 and BRs 12 automatically configure a MS-PW 22 so as to provision a first half of a VPWS. To provision the second half of the VPWS, admin 54 interfaces with UI module 52' of control unit 44' included within T-PE device 18B to define PW data 75, where the process outlined above in the example of FIGS. 5A, 5B is repeated only instead of flowing from T-PE device 18A to T-PE device 18B, the LDP and BGP messages flow from T-PE device 18B to T-PE device 18A so as to configure another MS-PW similar to MS-PW 22 that delivers traffic from T-PE device 18B to T-PE device 18A.

Figure 6A:
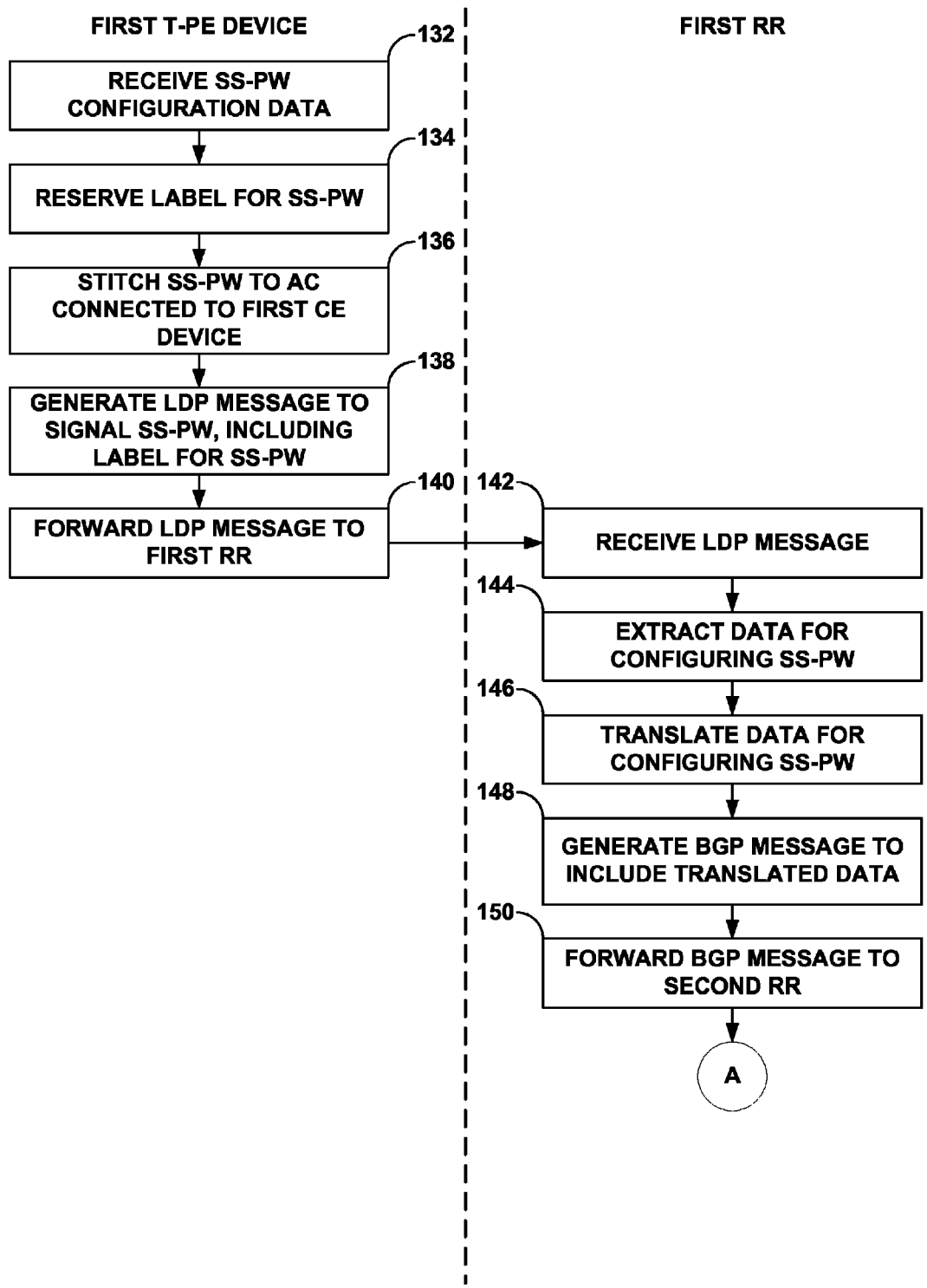
FIGS. 6A, 6B are flowcharts illustrating example operation of a system of network devices in implementing the techniques of this disclosure to automatically configure a cross-domain PW.
Figure 6B:
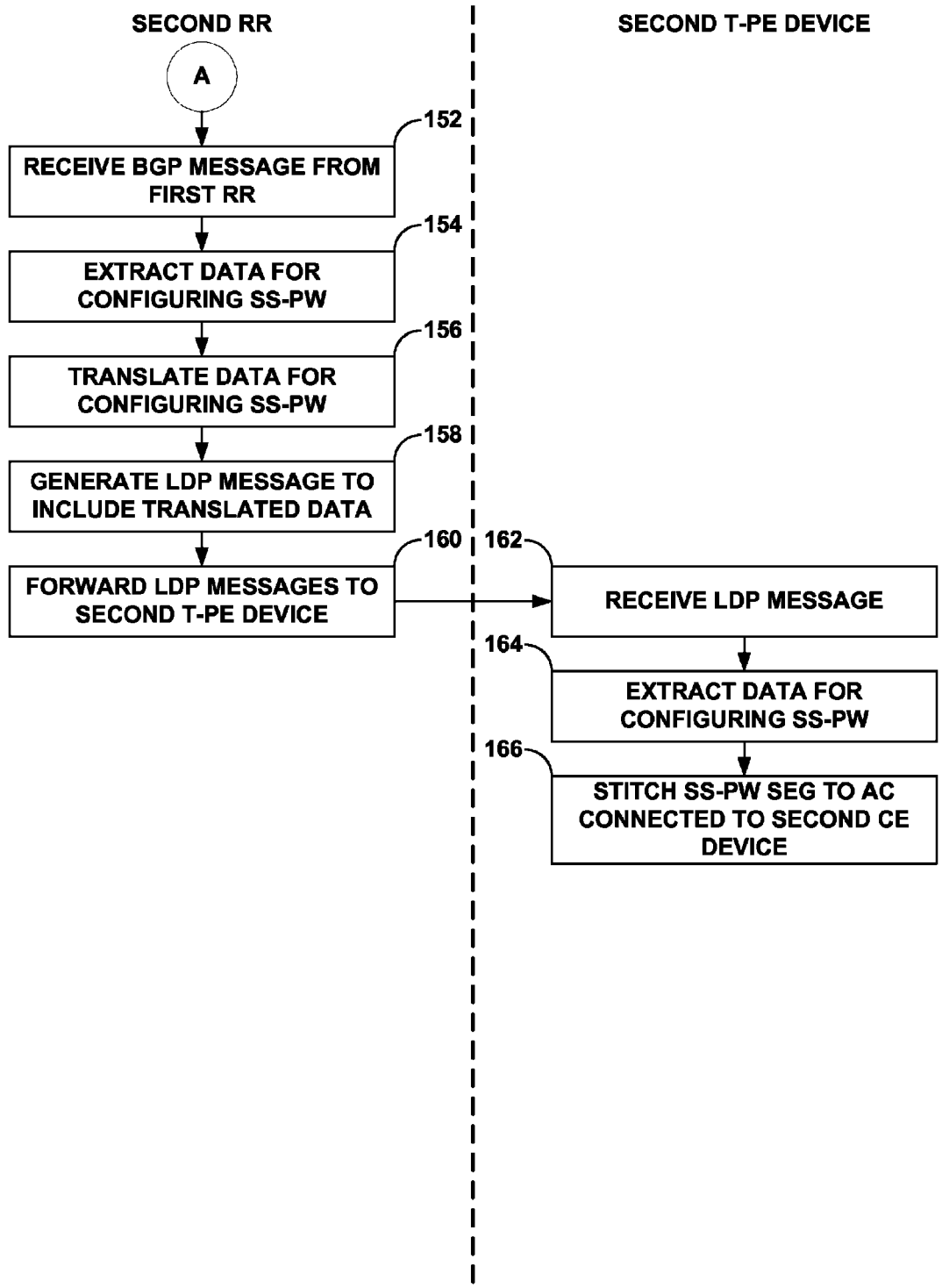

FIGS. 6A, 6B are flowcharts illustrating example operation of a system of network devices, such as T-PE devices 18 and RRs 36 of FIGS. 3A, 3B and 4, in implementing the techniques of this disclosure to automatically configure a cross-domain PW, such as SS-PW 38 shown in the example of FIG. 2. In some examples, it should be understood that RRs 36 of FIG. 4 are substituted for BRs 12 of FIGS. 3A, 3B. While described with respect to T-PE devices 18 and RRs 36 of FIGS. 3A, 3B and 4, the techniques set forth in the flowchart of FIG. 6A, 6B may be implemented by any type of network device, including switches, hubs, DSLAMs, cable modem termination systems (CMTSes), and wireless access points (WAPs).

Referring first to the example of FIG. 6A, initially an administrator, such as admin 54 of FIGS. 3A, 3B, may interface with UI module 52 of T-PE device 18A to define PW data 56. Admin 54 may also interface with UI module 52 to initiate the automatic configuration SS-PW 38 shown in FIG. 2. Thereafter, admin 54 need not perform any other operations and T-PE devices 18 and RRs 36 automatically configure SS-PW 38 in accordance with the techniques described in this disclosure. For ease of illustration purposes, it is assumed below that the one or more tunnels that encapsulate SS-PW 38 has been previously established.

UI module 56 of control unit 44 included within T-PE device 18A therefore receives PW data 56, which defines data for configuring SS-PW 38, and the initiation by admin 54 to begin the automatic configuration of SS-PW 38 (132). In response to this initiation, UI module 54 forwards PW data 56 to LDP module 50. LDP module 50 proceeds to reserve a label in label space 68 for use by SS-PW 38 (134). LDP module 50 then updates label tables 70 so as to stitch SS-PW 38 to the AC connected to CE device 20A, e.g., L2 interface 46, as described above (136). LDP module 50 also generates LDP message 40A to signal PW data 56 and the label reserved for SS-PW 38 via either a FEC-128 or FEC-129 element, as described above (138). LDP module 50 forwards LDP message 40A to RR 36A via L3 interface 48 (140).

One of L3 interfaces 79 of RR 36A receives LDP message 40A and forwards message 40A to LDP module 80 of control unit 78 included within RR 36A (142). LDP module 80 parses LDP message 40A to extract the PW data 56 and the label reserved for the SS-PW 38 stored to either the FEC-128 or FEC-129 element (144). After extracting this data and label, LDP module 80 forwards the data for configuring SS-PW 38 to translation module 82, which translates this data into a format that conforms to the BGP protocol (146). BGP module 84 receives the translated data from translation module 82 and generates BGP message 42 to include an NLRI that stores the translated data, as described above (148). BGP module 84 forwards BGP message 42 to RR 36B (150).

Referring to FIG. 6B, RR 36B receives BGP message 42 via one of L3 interfaces 79', whereupon BGP module 84' extracts the data stored to the NLRI for configuring SS-PW 38 (152, 154). BGP module 84' then forwards the extracted data to translation module 82', which translates the extracted data back to a format that conforms to the LDP FEC-128 or FEC-129 elements (156). Translation module 82' forwards the translated data to LDP module 80'. In response to this translated data, LDP module 80' generates LDP message 40B to include the translated data in the form of either a FEC-128 or FEC-129 element (158). LDP module 80' forwards LDP message 40B to T-PE device 18B via one of L3 interfaces 79' (160).

T-PE device 18B receives LDP message 40B via L3 interface 48', where LDP module 50' extracts the data for configuring SS-PW 38 from either the FEC-128 or FEC-129 element, as described above (162, 164). LDP module 50' then access label tables 70' to stitch SS-PW 38 to the AC to which CE device 20B is connected, e.g., L2 interface 46', as described above (130). In this way, T-PE devices 18 and RRs 36 automatically configure SS-PW 38 so as to provision a first half of a VPWS. To provision the second half of the VPWS, admin 54 interfaces with UI module 52' of control unit 44' included within T-PE device 18B to define PW data 75, where the process outlined above in the example of FIGS. 6A, 6B is repeated only instead of flowing from T-PE device 18A to T-PE device 18B, the LDP and BGP messages flow from T-PE device 18B to T-PE device 18A so as to configure another SS-PW similar to SS-PW 38 that delivers traffic from T-PE device 18B to T-PE device 18A.

Figure 7B:
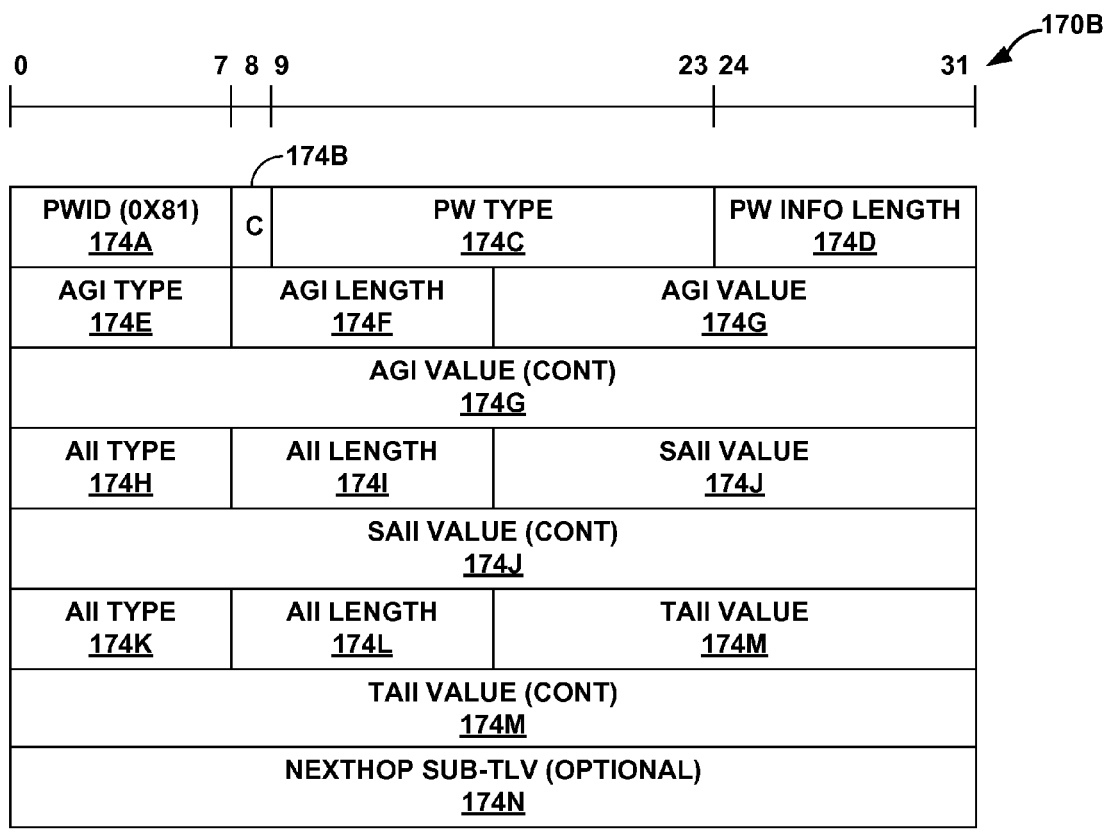

FIGS. 7A-7B are block diagrams illustrating exemplary FEC-128 and FEC-129 signaling elements 170A, 170B respectively. FIG. 7A is a block diagram illustrating an example FEC-128 element 170A. FEC-128 element 170A may be appended to an LDP message, such as LDP message 28A or 40A. More information regarding FEC-128 elements and their various uses, as well as, configuring intra-domain PWs using LDP can be found in RFC 4447, entitled "Pseudowire Setup and Maintenance Using the Label Distribution Protocol (LDP)," dated April 2006, which is herein incorporated by reference as if set forth in its entirety. RFC 4447 refers to FEC-128 element 170A as a "PWid FEC element," and discusses this element in section 5.2.

FEC-128 element 170A includes a PWid field 172A ("PWid 172A"), a control word bit field 172B ("C 172B"), a PW type field 172C ("PW type 172C"), a PW information length field 172D ("PW info length 172D"), a group identifier field 172E ("group ID 172E"), a PW identifier field 172F ("PW ID 172F"), and a plurality of interface parameter sub-TLV fields 172G-172N ("interface parameter sub-TLVs 172G-172N"). PWid field 172A is statically set to 0x80 as shown in the example of FIG. 7A, which is 128 in decimal, hence again the name "FEC-128." Control word bit field 172B stores a bit of data that flags the presence of a control word. PW type field 172C stores data defining the length in octets of PW ID field 172F and the interface parameter sub-TLVs 172G-172N. Group ID field 172E stores data defining an arbitrary 32-bit value that represents a group of PWs. This arbitrary 32-bit value is used to create groups in the PW space. The group ID stored to group ID field 172E is intended to be used as a port index, or a virtual tunnel index. PW ID field 172F stores data defining a non-zero 32-bit connection identifier (ID) that, together with the PW type stored to PW type field 172C, identifies a particular PW. PW ID field 172F may also be referred to, in some instances, as a virtual circuit (VC) identifier (VC-ID) field 172F. Each of interface parameter sub-TLVs 172G-172N represent variable-length TLVs used to provide interface specific parameters, such as attachment circuit maximum transmission unit (MTU).

As further shown in the example of FIG. 7A, FEC-128 element 170A also includes two additional sub-TLV referred to as a PE address sub-TLV 172P and an optional Nexthop sub-TLV 172Q. PE address sub-TLV 172P stores data defining an address of a T-PE that also terminates the cross-domain PW, such as T-PE device 18B shown in the examples of FIG. 1-4. BR 12A and RR 36A uses the LDP session address, which in the examples of this disclosure is the address of T-PE 12A, to construct the SAI and the address of the T-PE stored to PE address sub-TLV 172P to construct the TAI, which is described in more detail below. This PE address sub-TLV 172P may only be needed for FEC-128 elements to help identify PW uniquely because the virtual circuit identifier (VCID) is not generally globally unique. Next hop sub-TLV 172Q represents an optional field that stores data identifying an override transport LSP if there is more than one LSP configured between the two T-PE devices.

FIG. 7B is a block diagram illustrating an example FEC-129 element 170B. FEC-129 element 170B may be appended to an LDP message, such as LDP message 28A or 40A. More information regarding FEC-129 elements and their various uses, as well as, configuring intra-domain PWs using LDP can be found in the above incorporated RFC 4447. RFC 4447 refers to FEC-129 element 170B as a "generalized PWid FEC element," and discusses this element in section 5.3.

FEC-129 element 170B includes a PWid field 174A ("PWID 174A"), a control word bit field 174B ("C 174B"), a PW type field 174C ("PW type 174C"), a PW information length field 174D ("PW info length 174D"), an attachment group identifier (AGI) type field 174E ("AGI type 174E"), an AGI length field 174F ("AGI length 174F"), an AGI value field 174G ("AGI value 174G"), an attachment individual identifier (AII) type field 174H ("AII type 174H"), an AII length field 174I ("AII length 174I"), a source AII (SAII) value field 174J ("SAII value 174J"), another AII type field 174K ("AII type 174K"), another AII length field 174L ("AII length 174L"), a target AII (TAII) value field 174M ("TAII value 174M") and a nexthop sub-TLV 174N, which may be substantially similar to nexthop sub-TLV 172Q. PWid field 174A is set to a static number of 0x81 or 129 in decimal, hence again the name of "FEC-129." C 174B, PW type 174C and PW info length 174D are similar to C, PW type and PW info length 172B-172D. AGI type 174E, AGI length 174F and AGI value 174G form a TLV for defining an attribute that is shared by all of the attachment PWs or pools thereof that are allowed to be connected. AGI value 174G may store a virtual private network (VPN) identifier or a virtual local area network (VLAN) identifier. AII type 174H, AII length 174I and SAII value 174J represent another TLV for defining a source attachment circuit, while AII length 174K, AII length 174L and TAII value 174M represent a TLV for defining a target attachment circuit.

Figure 8:
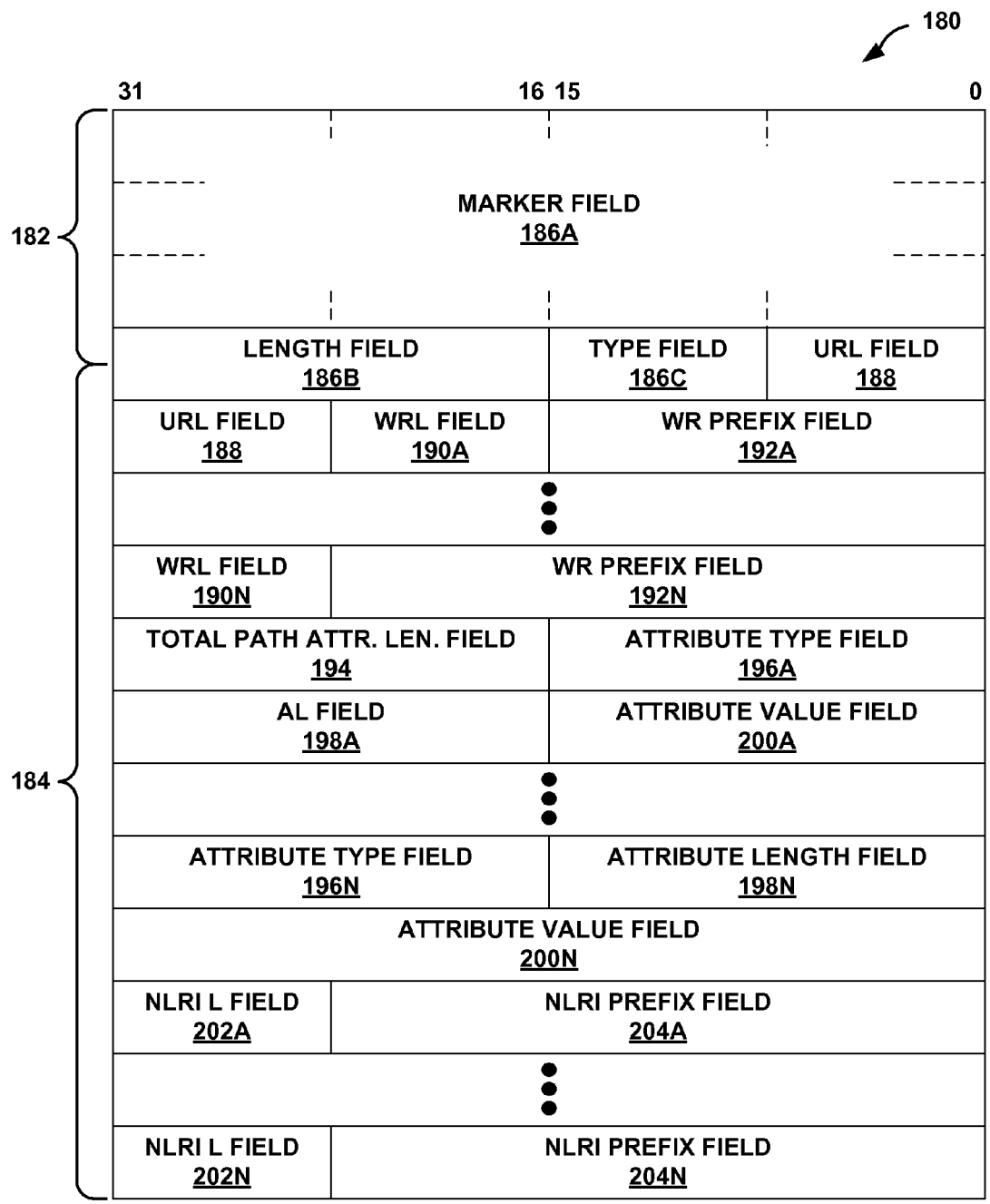
FIG. 8 is a block diagram illustrating an example BGP message 180 comprising one or more network layer reachability information (NLRI) fields for storing data from either a FEC-128 or FEC-129 element in accordance with the techniques described in this disclosure.

FIG. 8 is a block diagram illustrating an example BGP message 180 comprising one or more network layer reachability information (NLRI) fields for storing data from either a FEC-128 or FEC-129 element in accordance with the techniques described in this disclosure. BGP message 180 may represent an exemplary BGP update message and therefore may be referred to as BGP update message 80. While described with respect to a particular type of routing protocol, the techniques should not be limited strictly to BGP. Instead, the techniques may apply to any routing protocol capable of cross-domain transfer of routing information.

As shown in FIG. 8, BGP update message 180 includes a BGP header 182 and a BGP payload 184. BGP header 182 includes marker field 186A, length field 186B and type field 186C. Marker field 186A provides a field that stores information used for synchronization and authentication purposes between BGP peers, such as BRs 12. Length field 186B comprises a field that stores data defining a total length of BGP update message 180 in bytes, including the fields of the header. Type field 186C comprises a field that stores a type of the BGP message, where the type is usually expressed as an integer value. For BGP update messages, type field 186C may store an integer value of two (2).

BGP payload 184 may comprise unfeasibility routes length field 188 ("URL field 188"), withdrawn route length fields 190A-190N ("WRL fields 190") and corresponding withdrawn routes prefix fields 192A-192N ("WR prefix fields 192"), total path attribute length field 194 ("total path attr. len. field 194"), attribute type fields 196A-196N ("attribute type fields 196") and associated attribute length fields 198A-198N ("AL fields 198") and attribute value fields 200A-200N ("attribute value fields 200"), network layer reachability information length fields 202A-202N ("NLRI L fields 202") and associated NLRI prefix fields 204A-204N ("NLRI prefix fields 204"). URL field 188 comprises a field that stores data defining a total length of the corresponding WRL fields 190 plus the WR prefix fields 192. Each of WRL fields 190 comprise a field that stores data defining a number of bits in an IP address defined by a corresponding one of WR prefix fields 192 that are significant. Each of WR prefix fields 192 comprise a field that stores data defining the IP address prefix of the network whose route is being withdrawn. If URL field 188 stores a zero value, BGP update message 180 may omit both WRL fields 190 and WR prefix fields 192. Each one of WRL fields 190 and a corresponding of WR prefix fields 192 may denote a withdrawn route, e.g., a route that is not longer to be considered by BGP and removed from a route table included within BRs 12.

Total path attribute length field 194 comprises a field that stores data defining a total length of the sum total of the length of each "path attributes" fields in bytes. A path attributes field may comprise one of fields 196 and corresponding ones of fields 198 and 200. Each of attribute type fields 196 may comprise a field that stores data defining a type of the path attribute value defined by a corresponding one of fields 200. Each of attribute length fields 198 may comprise a field that defines a length in terms of bytes for a corresponding one of fields 200. Attribute value fields 200 may each comprise a field that stored data defining a value for the attribute of the type indicated by a corresponding one of attribute type fields 196.

Each pair of NLRI length fields 202 and NLRI prefix fields 204 may define an IP address prefix for the route being advertised. Each of NLRI length fields 202 may, like WLR fields 190, comprise a field that stores data defining a number of bits in an IP address defined by a corresponding one of NLRI prefix fields 202 that are significant. Each of NLRI prefix fields 204 may comprise a field that stores data defining the IP address prefix of the network whose route is being advertised.

With respect to the techniques described in this disclosure as implemented by BRs 12 of FIGS. 3A, 3B, translation module 64 of BR 12A parses data stored to FEC-128 element 170A of FIG. 7A and translates this data so as to store this data to one or more of NLRI fields 202, 204. As one example, translation module 64 of BR 12A parses the data stored to PWid field 172A to determine that the FEC element 170A is a FEC-128 element. Based on this determination, translation module 64 then extracts the data stored to group ID field 172E and PW ID field 172F. Translation module 64 then translates the data stored to group ID field 172E such that this data can be stored to one of NLRI fields 202, 204. In particular, translation module 64 generates length data that defines a length of NLRI prefix field 204A, which stores the group ID defined in group ID field 172E. Translation module 64 passes this length data and the group ID to BGP module 66, which stores the length data to NLRI L field 202A and the group ID to NLRI prefix field 204A. Likewise, translation module 64 generates additional length data defining a length of NLRI prefix field 204B, which stores PW ID stored to PW ID field 172A. Translation module 64 passes this additional length data and the data stored to PW ID field 172A to BGP module 66, which stores the additional length data to NLRI L field 202B and the PW ID data to NLRI prefix field 204B. In effect, BGP module 66 generates a new type of BGP update message 180 capable of storing NLRI for specifying data stored to a FEC-128 element.

As another example, one of NLRI fields 202, 204 represents a general NLRI field for storing information or data stored to either of FEC-128 or FEC-129 elements. This exemplary general one of NLRI fields 202, 204 may store a FEC type, an SAI, a TAI and a label. The FEC type may be discovered by translation module 64 in the manner described above. Translation module 64 determines the SAI based on the LDP session address and the TAI based on the data stored to PE address sub-TLV 172P. Translation module 64 determines the label in the manner described above. Translation module 64 then encodes data to this general one of NLRI fields 202, 204.

Translation module 64 may also parse the above described additional sub-TLVs, i.e., PE address sub-TLV 172P and nexthop sub-TLV 172Q and insert the data stored to these sub-TLVs 172P, 172Q as one or more NLRI L fields 202, 204. Additionally, translation module 64 may parse FEC-128 element 170A to extract PW status, interface parameters, and the like and add any of these fields as NLRI L/NLRI prefix fields 202, 204. Thus, while described above as translating only certain fields, any of the fields of FEC-128 element 170A may be parsed, translated, and inserted as NLRI L/NLRI prefix fields 202, 204. The techniques should therefore not be limited in this respect to the examples described in this disclosure.

Translation module 64' performs operations similar to translation module 64 but in reverse order to translate the PW signaling elements from the BGP update message to the LDP message. LDP module 50' of T-PE device 18B receives this LDP message 28B and parses this message to establish the PW. Generally, LDP module 50' of T-PE device 18B uses the data stored to PE address sub-TLV 172P to augment the FEC and thereby make it more likely to be unique. If nexthop sub-TLV 172Q is present in LDP message 28B (given that it is optional), LDP module 50' uses this nexthop data stored to sub-TLV 172Q to determine the transport LSP endpoint. IF it is not present, LDP module 50' uses the address assigned to BR 12B.

Alternatively, translation module 64 of BR 12A may also determine through parsing of PWid field 172A or 174A that a FEC element comprises a FEC-129 element. Based on this determination, translation module 64 extracts the AGI value, the SAII value and the TAII value stored to AGI value field 1746, SAII value field 174J and TAII value filed 174M. Translation module 64 then translates each of the extracted AGI, SAII, TAII values to store each of these values to a separate NLRI fields 202, 204 similar to the above described translation of each of the group ID and PW ID values. With respect to both FEC-128 and FEC-129 elements, translation module 64 also generates additional NLRI data that specifies the address of T-PE device 18A, as well as, the PW label assigned to either SS-PW 38 or the particular segment, which is in fact a separate PW, of MS-PW 22. Translation module 64 may, as noted above with respect to FEC-128 element 179A, also parse FEC-129 element 179B to retrieve any additional TLVs, such as nexthop sub-TLV 174N, and store the data stored to this sub-TLV 174N to NLRI L/NLRI prefix fields 202, 204. Again, while described above as translating only certain fields, any of the fields of FEC-129 element 170B may be parsed, translated, and inserted as NLRI L/NLRI prefix fields 202, 204. The techniques should therefore not be limited in this respect to the examples described in this disclosure. In some examples, translation modules 82, 82' of RRs 36 operate in a manner substantially similar to translation modules 64, 64' of BRs 12.

Various embodiments of the techniques have been described. These and other embodiments are within the scope of the following claims.

The invention claimed is:

1. A method comprising:
   receiving, with a first border router, a label distribution protocol (LDP) message from a first provider edge device in accordance with the label distribution protocol (LDP), the first border router is positioned between a first domain and a second domain of a computer network and in communication with a second border router of the second domain, wherein the first provider edge device is located at an edge of the first domain of the computer network, and wherein the LDP message includes data for configuring a cross-domain pseudowire (PW) as a multi-segment pseudowire (MS-PW);
   parsing, with the first intermediate device, the received LDP message to extract the data for configuring the cross-domain PW;
   transforming, with the first intermediate device, the extracted data to conform to a format defined by a routing protocol different from the LDP that includes extensions for advertising the cross-domain PW configuration data;
   forming, with the first intermediate device, a routing protocol message that includes the transformed data;
   outputting, with the first intermediate device, the routing protocol message to the second intermediate device to establish the cross-domain PW from the first provider edge device to a second provider edge device located at an edge of the second domain of the computer network to span the first domain and the second domain;
   receiving an encapsulated layer 2 (L2) data unit from the second border router, wherein the encapsulated L2 data unit comprises a header specifying a label stack containing a first label reserved by the first border router for use by a first segment of the MS-PW and a L2 data unit, and wherein the first segment of the MS-PW comprises a first pseudowire (PW) between the first and second border routers;
   removing the label from the label stack of the header of the encapsulated L2 data unit;
   pushing a second label reserved by the first provider edge device for use by a second segment of the MS-PW onto the label stack of the header of the encapsulated L2 data unit, wherein the second segment of the MS-PW comprises a second PW between the first provider edge device and the first border router; and
   after pushing the second label onto the label stack, forwarding the encapsulated L2 data unit to the first provider edge device for delivery to a customer network.

2. The method of claim 1, wherein the routing protocol that includes extensions for advertising cross-domain PW configuration data comprises the BGP routing protocol that includes network layer reachability information (NLRI) fields defined to carry the data for configuring the cross-domain PW.

3. The method of claim 1, wherein receiving a LDP message comprises receiving a LDP message from a first provider edge device that does not implement extensions to the routing protocol that store the data for configuring the cross-domain PW.

4. The method of claim 1,
   wherein the LDP message includes a forwarding equivalence class-128 (FEC-128) element that stores the data for configuring the cross-domain PW,
   wherein the FEC-128 element includes a group identifier field that stores group identifier data defining a group identifier and a pseudowire (PW) identifier field that stores PW identifier data defining a PW identifier,
   wherein parsing the received LDP message includes parsing the LDP message to extract the group identifier data and the PW identifier data from the FEC-128 element of the LDP message,
   wherein transforming the extracted data comprises transforming the group identifier data and the PW identifier data to conform to one or more extensible fields of the routing protocol, and
   wherein forming the routing protocol message includes forming the routing protocol message to include the one or more extensible fields to contain the group identifier data and PW identifier data extracted from the LDP message.

5. The method of claim 1,
wherein the LDP message includes a forwarding equivalence class-128 (FEC-128) element that stores the data for configuring the cross-domain PW,
wherein the FEC-128 element includes a group identifier field that stores group identifier data defining a group identifier, a pseudowire (PW) identifier field that stores PW identifier data defining a PW identifier and a provider edge (PE) device address field that stores PE address data defining a PE address assigned to the first provider edge device,
wherein parsing the received LDP message includes parsing the LDP message to extract the group identifier data, the PW identifier data and the PE address data from the FEC-128 element of the LDP message,
wherein transforming the extracted data comprises transforming the group identifier data, the PW identifier data and the PE address data to conform to one or more extensible fields of the routing protocol, and
wherein forming the routing protocol message includes forming the routing protocol message to include the one or more extensible fields to contain the group identifier data, the PW identifier data and the PE address data extracted from the LDP message.

6. The method of claim 5,
wherein the FEC-128 element further includes a nexthop field that stores nexthop data,
wherein parsing the received LDP message further includes parsing the LDP message to extract nexthop data,
wherein transforming the extracted data further includes transforming the nexthop data to conform to the one or more extensible fields of the routing protocol, and
wherein forming the routing protocol message further includes forming the routing protocol message to include the one or more extensible fields that contain nexthop data extracted from the LDP message.

7. The method of claim 1,
wherein the LDP message includes a forwarding equivalence class-129 (FEC-129) element that stores the data for configuring the cross-domain PW,
wherein the FEC-129 element includes an attachment group identifier (AGI) field that stores AGI data defining an AGI, a target attachment individual identifier (TAII) value field that stores TAII data defining a TAII value and a source attachment individual identifier (SAII) value field that stores SAII data defining a SAII value,
wherein parsing the received LDP message includes parsing the LDP message to extract the AGI, SAII and TAII data from the FEC-129 element of the LDP message,
wherein transforming the extracted data comprises transforming the AGI, TAII and SAII data to conform to one or more extensible fields of the routing protocol, and
wherein forming the routing protocol message includes forming the routing protocol message to include the one or more extensible fields to contain the AGI data, the TAII data and the SAII data.

8. The method of claim 7,
wherein the FEC-129 element further includes a nexthop field that stores nexthop data,
wherein parsing the received LDP message further includes parsing the LDP message to extract nexthop data,
wherein transforming the extracted data further includes transforming the nexthop data to conform to the one or more extensible fields of the routing protocol, and
wherein forming the routing protocol message further includes forming the routing protocol message to include the one or more extensible fields that contain nexthop data extracted from the LDP message.

9. The method of claim 1,
further comprising:
parsing a label from the received LDP message that the first provider edge device is assigned to the first segment of the MS-PW;
updating one or more entries within at least one label table to associate the parsed label with the first segment of the MS-PW; and
reserving a label in a label space maintained by the first network device for use by the second segment of the MS-PW,
wherein forming a routing protocol message includes forming the routing protocol message to signal the label reserved for use by the second segment of the MS-PW.

10. The method of claim 9, further comprising updating the one or more entries of the at least one label table to stitch the first segment of the MS-PW to the second segment of the MS-PW.

11. The method of claim 1,
wherein the LDP message includes a forwarding equivalence class (FEC) element comprising a PWid field that defines a type of the FEC element, and
wherein parsing the received LDP message comprises:
parsing the LDP message to extract data stored to the PWid field;
determining the type of the FEC element based on the extracted data stored to the PWid field; and
parsing the FEC element based on the determined type.

12. The method of claim 1, wherein each of the first and second provider edge devices comprise one of a router, a digital subscriber line access multiplexor (DSLAM), a cable modem termination system (CMTS), and a switch.

13. A first border router positioned between a first domain and a second domain of a computer network and in communication with a second border router of the second domain, the first border router comprising:
at least one interface that receives a label distribution protocol (LDP) message from a first provider edge device in accordance with a label distribution protocol (LDP), wherein the first provider edge device is located at an edge of the first domain of the computer network, and wherein the LDP message includes data for configuring a cross-domain pseudowire (PW) as a multi-segment pseudowire (MS-PW);
a control unit that includes:
an LDP module that parses the received LDP message to extract the data for configuring the cross-domain PW;
a translation module that transforms the extracted data to conform to a format defined by a routing protocol different from the LDP that includes extensions for advertising the cross-domain PW configuration data; and
a routing protocol module that forms a routing protocol message that includes the transformed data,
wherein the at least one interface outputs the routing protocol message to the second intermediate device to establish the cross-domain PW from the first provider edge device to a second provider edge device located at an edge of the second domain of the computer network to span the first domain and the second domain,
wherein the at least one interface receives an encapsulated layer 2 (L2) data unit from the second border router, wherein the encapsulated L2 data unit comprises a header specifying a label stack containing a first label reserved by the first border router for use by a first segment of the MS-PW and a L2 data unit, and wherein the first segment of the MS-PW comprises a first pseudowire (PW) between the first and second border routers;

wherein the LDP module removes the label from the label stack of the header of the encapsulated L2 data unit, pushes a second label reserved by the first provider edge device for use by a second segment of the MS-PW onto the label stack of the header of the encapsulated L2 data unit, wherein the second segment of the MS-PW comprises a second PW between the first provider edge device and the first border router, and wherein, after pushing the second label onto the label stack, the at least one interface forwards the encapsulated L2 data unit to the first provider edge device for delivery to a customer network.

14. The first border router of claim 13, wherein the routing protocol that includes extensions for advertising cross-domain PW configuration data comprises the BGP routing protocol that includes network layer reachability information (NLRI) fields defined to carry the data for configuring the cross-domain PW.

15. The first border router of claim 13, wherein the at least one interface receives an LDP message from a first provider edge device that does not implement extensions to the routing protocol that store the data for configuring the cross-domain PW.

16. The first border router of claim 13, wherein the LDP message includes a forwarding equivalence class-128 (FEC-128) element that stores the data for configuring the cross-domain PW, wherein the FEC-128 element includes a group identifier field that stores group identifier data defining a group identifier and a pseudowire (PW) identifier field that stores PW identifier data defining a PW identifier, wherein the LDP module parses the LDP message to extract the group identifier data and the PW identifier data from the FEC-128 element of the LDP message, wherein the translation module transforms the group identifier data and the PW identifier data to conform to one or more extensible fields of the routing protocol, and wherein the routing protocol module forms the routing protocol message to include the one or more extensible fields to contain the group identifier data and PW identifier data extracted from the LDP message.

17. The first border router of claim 13, wherein the LDP message includes a forwarding equivalence class-128 (FEC-128) element that stores the data for configuring the cross-domain PW, wherein the FEC-128 element includes a group identifier field that stores group identifier data defining a group identifier, a pseudowire (PW) identifier field that stores PW identifier data defining a PW identifier and a provider edge (PE) device address field that stores PE address data defining a PE address assigned to the first provider edge device, wherein the LDP module parses the LDP message to extract the group identifier data, the PW identifier data and the PE address data from the FEC-128 element of the LDP message, wherein the translation module transforms the group identifier data, the PW identifier data and the PE address data to conform to one or more extensible fields of the routing protocol, and wherein the routing protocol module forms the routing protocol message to include the one or more extensible fields to contain the group identifier data, the PW identifier data and the PE address data extracted from the LDP message.

18. The first border router of claim 17, wherein the FEC-128 element further includes a nexthop field that stores nexthop data, wherein the LDP module parses the LDP message to extract nexthop data, wherein the translation module transforms the nexthop data to conform to the one or more extensible fields of the routing protocol, and wherein the routing protocol module forms the routing protocol message to include the one or more extensible fields that contain nexthop data extracted from the LDP message.

19. The first border router of claim 13, wherein the LDP message includes a forwarding equivalence class-129 (FEC-129) element that stores the data for configuring the cross-domain PW, wherein the FEC-129 element includes an attachment group identifier (AGI) field that stores AGI data defining an AGI, a target attachment individual identifier (TAII) value field that stores TAII data defining a TAII value and a source attachment individual identifier (SAII) value field that stores SAII data defining a SAII value, wherein the LDP module parses the LDP message to extract the AGI, SAII and TAII data from the FEC-129 element of the LDP message, wherein the translation module transforms the AGI, TAII and SAII data to conform to one or more extensible fields of the routing protocol, and wherein the routing protocol module forms the routing protocol message to include the one or more extensible fields to contain the AGI data, the TAII data and the SAII data.

20. The first border router of claim 19, wherein the FEC-129 element further includes a nexthop field that stores nexthop data, wherein the LDP module parses the LDP message to extract nexthop data, wherein the translation module transforms the nexthop data to conform to the one or more extensible fields of the routing protocol, and wherein the routing protocol module forms the routing protocol message to include the one or more extensible fields that contain nexthop data extracted from the LDP message.

21. The first border router of claim 13, wherein the LDP module parses a label from the received LDP message that the first provider edge device assigned to a first LDP segment of the MS-PW, updates one or more entries within at least one label table to associate the parsed label with the first LDP segment of the MS-PW and reserves a label in a label space maintained by the first network device for use by a second routing protocol segment of the MS-PW, and wherein the routing protocol module forms the routing protocol message to signal the label reserved for use by the second routing protocol segment of the MS-PW.

22. The first border router of claim 21, wherein the LDP module updates the one or more entries of the at least one label table to stitch the first LDP segment of the MS-PW to the second routing protocol segment of the MS-PW.

23. The first border router of claim 13, wherein the LDP message includes a forwarding equivalence class (FEC) element comprising a PWid field that defines a type of the FEC element, and wherein the LDP module parses the LDP message to extract data stored to the PWid field, determines the type of the FEC element based on the extracted data stored to the PWid field and parses the FEC element based on the determined type.

24. The first border router of claim 13, wherein each of the first and second provider edge devices comprise one of a router, a digital subscriber line access multiplexor (DSLAM), a cable modem termination system (CMTS), and a switch.

25. A network system comprising:
a first customer network that includes a first customer edge device positioned at the edge of the first customer network;
a second customer network that includes a second customer edge device positioned at the edge of the second customer network;
a first domain that includes:
a first network device positioned at a border of the first domain; and
a first provider edge device positioned at an edge of the first domain that is communicatively coupled to the first network device and the first customer edge device; and
a second domain that includes:
a second network device positioned at a border of the second domain that is communicatively coupled to the first network device; and
a second provider edge device positioned at an edge of the second domain that is communicatively coupled to the second network device and the second customer edge device,
wherein the first network device includes:
at least one interface that receives a label distribution protocol (LDP) message from the first provider edge device in accordance with a label distribution protocol (LDP),
wherein the LDP message includes a forwarding equivalence class-128 (FEC-128) element that stores data for configuring a cross-domain pseudowire (PW) including a group identifier field that stores group identifier data defining a group identifier, a pseudowire (PW) identifier field that stores PW identifier data defining a PW identifier and a provider edge (PE) device address field that stores PE address data defining a PE address assigned to the first provider edge device,
wherein the first provider edge device only supports a forwarding equivalence class-128 (FEC-128) element of LDP to define the data for configuring the cross-domain PW, and
wherein the second provider edge device only supports a FEC-129 element of LDP to define the data for configuring the cross-domain PW;
a control unit that includes:
an LDP module that parses the received LDP message to extract the group identifier data, the PW identifier data and the PE address data from the FEC-128 element of the LDP message;
a translation module that transforms the group identifier data, the PW identifier data and the PE address data to conform to one or more extensible fields for advertising the cross-domain PW configuration data of a routing protocol different from the LDP; and
a routing protocol module that forms a routing protocol message to include the one or more extensible fields to contain the group identifier data, the PW identifier data and the PE address data extracted from the LDP message,
wherein the at least one interface outputs the routing protocol message to the second network device to establish the cross-domain PW from the first provider edge device to the second provider edge device located at an edge of the second domain of the computer network to span the first domain and the second domain; and
wherein the second network device includes:
at least one interface that receives the routing protocol message; and
a control unit that includes:
a routing protocol module that parses the received routing protocol message to extract the group identifier data, the PW identifier data and the PE address data stored to the one or more extensible fields;
a translation module that transforms the extracted group identifier data, the extracted PW identifier data and the extracted PE address data to generate transformed data that conforms to the FEC-129 element; and
an LDP module that generates an LDP message having a FEC-129 element that stores the transformed data,
wherein the at least one interface of the second network device outputs the LDP message having the FEC-129 element to the second provider edge device.

26. A non-transitory computer-readable storage medium comprising instructions for causing a processor to:
receive, with a first border router, a label distribution protocol (LDP) message from a first provider edge device in accordance with a label distribution protocol, the first border router is positioned between a first domain and a second domain of a computer network and in communication with a second intermediate device of the second domain, wherein the first provider edge device is located at an edge of the first domain of the computer network, and wherein the LDP message includes data for configuring a cross-domain pseudowire (PW) as a multi-segment pseudowire (MS-PW);
parse, with the first border router, the received LDP message to extract the data for configuring the cross-domain PW;
transform, with the first border router, the extracted data to conform to a format defined by a routing protocol that includes extensions for advertising the cross-domain PW configuration data, wherein the routing protocol is different than the LDP;
form, with the first border router, a routing protocol message that includes the transformed data; and
output, with the first border router, the routing protocol message to the second border router to establish the cross-domain PW from the first provider edge device to a second provider edge device located at an edge of the second domain of the computer network to span the first domain and the second domain;
receive an encapsulated layer 2 (L2) data unit from the second border router, wherein the encapsulated L2 data unit comprises a header specifying a label stack containing a first label reserved by the first border router for use by a first segment of the MS-PW and a L2 data unit, and wherein the first segment of the MS-PW comprises a first pseudowire (PW) between the first and second border routers;
remove the label from the label stack of the header of the encapsulated L2 data unit;
push a second label reserved by the first provider edge device for use by a second segment of the MS-PW onto the label stack of the header of the encapsulated L2 data unit, wherein the second segment of the MS-PW comprises a second PW between the first provider edge device and the first border router; and after pushing the second label onto the label stack, forward the encapsulated L2 data unit to the first provider edge device for delivery to a customer network.

27. A method comprising:
receiving, with a first-route reflector, a label distribution protocol (LDP) message from a first provider edge device in accordance with the label distribution protocol (LDP), the first route reflector is positioned between a first domain and a second domain of a computer network and in communication with a second route reflector of the second domain, wherein the first provider edge device is located at an edge of the first domain of the computer network, and wherein the LDP message includes data for configuring a cross-domain pseudowire (PW) as a single-segment pseudowire (SS-PW);
parsing, with the first route reflector, the received LDP message to extract the data for configuring the cross-domain PW, the data including a label assigned to the SS-PW by the first provider edge device;
transforming, with the first route reflector, the extracted data to conform to a format defined by a routing protocol different from the LDP that includes extensions for advertising the cross-domain PW configuration data;
forming, with the first route reflector, a routing protocol message to include the transformed data so as to signal the label reserved for use by the SS-PW; and
outputting, with the first route reflector, the routing protocol message to the second intermediate device to establish the cross-domain PW from the first provider edge device to a second provider edge device located at an edge of the second domain of the computer network to span the first domain and the second domain;
wherein the second route reflector is positioned between the first route reflector and the second provider edge device,
wherein the first route reflector is positioned between the first provider edge device and the second route reflector.

28. The method of claim 27, wherein the routing protocol that includes extensions for advertising cross-domain PW configuration data comprises the BGP routing protocol that includes network layer reachability information (NLRI) fields defined to carry the data for configuring the cross-domain PW.

29. The method of claim 27, wherein receiving a LDP message comprises receiving a LDP message from a first provider edge device that does not implement extensions to the routing protocol that store the data for configuring the cross-domain PW.

30. The method of claim 27,
wherein the LDP message includes a forwarding equivalence class-128 (FEC-128) element that stores the data for configuring the cross-domain PW,
wherein the FEC-128 element includes a group identifier field that stores group identifier data defining a group identifier and a pseudowire (PW) identifier field that stores PW identifier data defining a PW identifier,
wherein parsing the received LDP message includes parsing the LDP message to extract the group identifier data and the PW identifier data from the FEC-128 element of the LDP message,
wherein transforming the extracted data comprises transforming the group identifier data and the PW identifier data to conform to one or more extensible fields of the routing protocol, and
wherein forming the routing protocol message includes forming the routing protocol message to include the one or more extensible fields to contain the group identifier data and PW identifier data extracted from the LDP message.

31. The method of claim 27,
wherein the LDP message includes a forwarding equivalence class-128 (FEC-128) element that stores the data for configuring the cross-domain PW,
wherein the FEC-128 element includes a group identifier field that stores group identifier data defining a group identifier, a pseudowire (PW) identifier field that stores PW identifier data defining a PW identifier and a provider edge (PE) device address field that stores PE address data defining a PE address assigned to the first provider edge device,
wherein parsing the received LDP message includes parsing the LDP message to extract the group identifier data, the PW identifier data and the PE address data from the FEC-128 element of the LDP message,
wherein transforming the extracted data comprises transforming the group identifier data, the PW identifier data and the PE address data to conform to one or more extensible fields of the routing protocol, and
wherein forming the routing protocol message includes forming the routing protocol message to include the one or more extensible fields to contain the group identifier data, the PW identifier data and the PE address data extracted from the LDP message.

32. The method of claim 31,
wherein the FEC-128 element further includes a nexthop field that stores nexthop data,
wherein parsing the received LDP message further includes parsing the LDP message to extract nexthop data,
wherein transforming the extracted data further includes transforming the nexthop data to conform to the one or more extensible fields of the routing protocol, and
wherein forming the routing protocol message further includes forming the routing protocol message to include the one or more extensible fields that contain nexthop data extracted from the LDP message.

33. The method of claim 27,
wherein the LDP message includes a forwarding equivalence class-129 (FEC-129) element that stores the data for configuring the cross-domain PW,
wherein the FEC-129 element includes an attachment group identifier (AGI) field that stores AGI data defining an AGI, a target attachment individual identifier (TAII) value field that stores TAII data defining a TAII value and a source attachment individual identifier (SAII) value field that stores SAII data defining a SAII value,
wherein parsing the received LDP message includes parsing the LDP message to extract the AGI, SAII and TAII data from the FEC-129 element of the LDP message,
wherein transforming the extracted data comprises transforming the AGI, TAII and SAII data to conform to one or more extensible fields of the routing protocol, and
wherein forming the routing protocol message includes forming the routing protocol message to include the one or more extensible fields to contain the AGI data, the TAII data and the SAII data.

34. The method of claim 33,
wherein the FEC-129 element further includes a nexthop field that stores nexthop data,
wherein parsing the received LDP message further includes parsing the LDP message to extract nexthop data, wherein transforming the extracted data further includes transforming the nexthop data to conform to the one or more extensible fields of the routing protocol, and wherein forming the routing protocol message further includes forming the routing protocol message to include the one or more extensible fields that contain nexthop data extracted from the LDP message.

35. A first route reflector positioned between a first domain and a second domain of a computer network and in communication with a second route reflector of the second domain, the first route reflector comprising:

at least one interface that receives a label distribution protocol (LDP) message from a first provider edge device in accordance with a label distribution protocol (LDP), wherein the first provider edge device is located at an edge of the first domain of the computer network, and wherein the LDP message includes data for configuring a cross-domain pseudowire (PW) as a single-segment pseudowire (SS-PW); a control unit that includes: an LDP module that parses the received LDP message to extract the data for configuring the cross-domain PW, the data including a label assigned to the SS-PW by the first provider edge device;

a translation module that transforms the extracted data to conform to a format defined by a routing protocol different from the LDP that includes extensions for advertising the cross-domain PW configuration data; and a routing protocol module that forms a routing protocol message that includes the transformed data so as to signal the label reserved for use by the SS-PW, wherein the at least one interface outputs the routing protocol message to the second intermediate device to establish the cross-domain PW from the first provider edge device to a second provider edge device located at an edge of the second domain of the computer network to span the first domain and the second domain;

wherein the second route reflector is positioned between the first route reflector and the second provider edge device, wherein the first route reflector is positioned between the first provider edge device and the second route reflector.

36. The first route reflector of claim 35, wherein the routing protocol that includes extensions for advertising cross-domain PW configuration data comprises the BGP routing protocol that includes network layer reachability information (NLRI) fields defined to carry the data for configuring the cross-domain PW.

37. The first route reflector of claim 35, wherein the at least one interface receives an LDP message from a first provider edge device that does not implement extensions to the routing protocol that store the data for configuring the cross-domain PW.

38. The first route reflector of claim 35, wherein the LDP message includes a forwarding equivalence class-128 (FEC-128) element that stores the data for configuring the cross-domain PW, wherein the FEC-128 element includes a group identifier field that stores group identifier data defining a group identifier and a pseudowire (PW) identifier field that stores PW identifier data defining a PW identifier, wherein the LDP module parses the LDP message to extract the group identifier data and the PW identifier data from the FEC-128 element of the LDP message, wherein the translation module transforms the group identifier data and the PW identifier data to conform to one or more extensible fields of the routing protocol, and wherein the routing protocol module forms the routing protocol message to include the one or more extensible fields to contain the group identifier data and PW identifier data extracted from the LDP message.

39. The first route reflector of claim 35, wherein the LDP message includes a forwarding equivalence class-128 (FEC-128) element that stores the data for configuring the cross-domain PW, wherein the FEC-128 element includes a group identifier field that stores group identifier data defining a group identifier, a pseudowire (PW) identifier field that stores PW identifier data defining a PW identifier and a provider edge (PE) device address field that stores PE address data defining a PE address assigned to the first provider edge device, wherein the LDP module parses the LDP message to extract the group identifier data, the PW identifier data and the PE address data from the FEC-128 element of the LDP message, wherein the translation module transforms the group identifier data, the PW identifier data and the PE address data to conform to one or more extensible fields of the routing protocol, and wherein the routing protocol module forms the routing protocol message to include the one or more extensible fields to contain the group identifier data, the PW identifier data and the PE address data extracted from the LDP message.

40. The first route reflector of claim 39, wherein the FEC-128 element further includes a nexthop field that stores nexthop data, wherein the LDP module parses the LDP message to extract nexthop data, wherein the translation module transforms the nexthop data to conform to the one or more extensible fields of the routing protocol, and wherein the routing protocol module forms the routing protocol message to include the one or more extensible fields that contain nexthop data extracted from the LDP message.

41. The first route reflector of claim 35, wherein the LDP message includes a forwarding equivalence class-129 (FEC-129) element that stores the data for configuring the cross-domain PW, wherein the FEC-129 element includes an attachment group identifier (AGI) field that stores AGI data defining an AGI, a target attachment individual identifier (TAII) value field that stores TAII data defining a TAII value and a source attachment individual identifier (SAII) value field that stores SAII data defining a SAII value, wherein the LDP module parses the LDP message to extract the AGI, SAII and TAII data from the FEC-129 element of the LDP message, wherein the translation module transforms the AGI, TAII and SAII data to conform to one or more extensible fields of the routing protocol, and wherein the routing protocol module forms the routing protocol message to include the one or more extensible fields to contain the AGI data, the TAII data and the SAII data.

42. The first route reflector of claim 41, wherein the FEC-129 element further includes a nexthop field that stores nexthop data, wherein the LDP module parses the LDP message to extract nexthop data, wherein the translation module transforms the nexthop data to conform to the one or more extensible fields of the routing protocol, and wherein the routing protocol module forms the routing protocol message to include the one or more extensible fields that contain nexthop data extracted from the LDP message.

43. A non-transitory computer-readable storage medium comprising instructions for causing a processor of a first route reflector to:

receive a label distribution protocol (LDP) message from a first provider edge device in accordance with the label distribution protocol (LDP), the first route reflector is positioned between a first domain and a second domain of a computer network and in communication with a second route reflector of the second domain, wherein the first provider edge device is located at an edge of the first domain of the computer network, and wherein the LDP message includes data for configuring a cross-domain pseudowire (PW) as a single-segment pseudowire (SS-PW);

parse the received LDP message to extract the data for configuring the cross-domain PW, the data including a label assigned to the SS-PW by the first provider edge device;

transform the extracted data to conform to a format defined by a routing protocol different from the LDP that includes extensions for advertising the cross-domain PW configuration data;

form a routing protocol message to include the transformed data so as to signal the label reserved for use by the SS-PW; and output the routing protocol message to the second intermediate device to establish the cross-domain PW from the first provider edge device to a second provider edge device located at an edge of the second domain of the computer network to span the first domain and the second domain;

wherein the second route reflector is positioned between the first route reflector and the second provider edge device, wherein the first route reflector is positioned between the first provider edge device and the second route reflector.

* * * * *